US008113941B2

(12) United States Patent
Gomez et al.

(10) Patent No.: US 8,113,941 B2

(45) **Date of Patent: *Feb. 14, 2012**

(54) CHAIN REACTION GAME

(75) Inventors: Benjamin T. Gomez, Chicago, IL (US); Duncan F. Brown, Grayslake, IL (US); Scott D. Slomiany, Streamwood, IL (US); Lawrence E. DeMar, Winnetka, IL (US)

(73) Assignee: Case Venture Management, LLC, Wheeling, IL (US)

(*) Notice: Subject to any disclaimer, the term of this patent is extended or adjusted under 35 U.S.C. 154(b) by 1238 days.

This patent is subject to a terminal disclaimer.

(21) Appl. No.: 11/412,527

(22) Filed: Apr. 27, 2006

(65) Prior Publication Data

US 2006/0205473 A1 Sep. 14, 2006

Related U.S. Application Data

(62) Division of application No. 10/231,550, filed on Aug. 30, 2002, now Pat. No. 7,144,322.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl. ................................ 463/20; 463/9; 463/16

(58) Field of Classification Search ................ 463/9, 16, 463/20

See application file for complete search history.

(56) References Cited

U.S. PATENT DOCUMENTS 6,311,976 B1 11/2001 Yoseloff et al.
6,602,135 B1 * 8/2003 Gerrard .......................... 463/16
2003/0054874 A1 3/2003 Kaminkow
2003/0157981 A1 8/2003 Marks et al.
2004/0043809 A1 3/2004 Gomez et al.

OTHER PUBLICATIONS

Maki Game, website description 2002 [online] Retrieved from the Internet: URL http://www.linux-solutions.at/projects/zaurus/games.Maki.html.*

Buffet Mania Video Slots iGame-Plus Series, brochure.

Maki Game, website description http://www.linux-solutions.at/projects/zaurus/games-Maki.html.

Klax Game, website description http://www.klazworld.com/flash-backs.jsp.

Super Puzzle Fighter, website description http://www.capcom.com/online_games/spf/.

Bubble Bobble, website description http://taito.overclocked.org\bbobble.html.

Bust-A-Move, website description www.klov.com/game_detail.php?letter=game_id=7246.

(Continued)

*Primary Examiner* — Melba Bumgarner
*Assistant Examiner* — Marcus Jones
(74) *Attorney, Agent, or Firm* — McDonnell Boehnen Hulbert & Berghoff LLP

(57) ABSTRACT

A game, gaming machine apparatus and game method wherein game elements are assigned to a matrix of game element locations. Play is initiated by evaluating the game elements for predetermined transformative conditions, such as a match of game elements. If a transformative condition is found, the game element(s) are transformed with at least one being removed from the matrix. The remaining game elements are moved, if permitted, according to a movement methodology. The steps of evaluating, transforming, removing, and moving the remaining game elements are repeated so long as a transformation is subsequently available for continued gameplay.

8 Claims, 20 Drawing Sheets

OTHER PUBLICATIONS

Freeze!, website description http://www.klov.com/game_detail.php?letter=Fgame_id=7852.
Columns, website description http://www.klov.com/game_detail.php?letter=game_id=7369.
Dr. Mario 64, website description http://www.nintendo.com/games/gamepage/description.jsp?gameId=326#about.
Puyo Pop website description, http://www.nintendo.com/games/gamepage/description.jsp?gameId=779#about.
Yoshi's Cookie, website description http://www.geocities.com/rabbi_vole/yoshicoo.htm.
Ranma Puzzle, website description http://www.geocities.com/rabbi_vole/ranma.htm.
Bejeweled, website description http://www.go2share.net/game/bejeweled/.
Snood Version 3.01W Manual, website description http://www.snood.com.
Puzzle Pirates about news forums support account play!, website description http://www.puzzlepirates.com/about/.
John Scarne, Scarne's Encyclopedia of Card Games, Poker Solitaire, p. 412.
Super Collapse Game, website description, http://wwwsoftwrap.com/feat_apps.asp, dated Oct. 11, 2002.
Tetris game, as described in the Information Disclosure Statement.
Collapse II Game, website description, Http://www.shockwave.com/sw/content/collapse, dated May 16, 2003.

* cited by examiner

CHAIN REACTION GAME

This application is a Divisional of U.S. Ser. No. 10/231,550, filed Aug. 30, 2002 now U.S. Pat. No. 7,144,322.

FIELD OF THE INVENTION

This invention relates to a game, and one particularly adapted for a video display, and even more particularly adapted to a gaming machine or other gaming environment (e.g., Internet) wherein the game evaluates an initial gameplay condition (e.g. "deal"), transforms certain (e.g., related) game elements as may be appropriate, preferably with some rearrangement of remaining game elements, and repeats the evaluations, transformations and rearrangement so long as there is a transformative relationship for continued gameplay.

BACKGROUND OF THE INVENTION

Traditional slot machines have a plurality of rotating mechanical reels, which rotate and then stop to show symbols on one or more paylines drawn across the reels. Players wager coins or credits on one or more of these paylines and are paid for certain combinations of symbols on a payline for which a wager has been placed. Video slot machines typically show the same type of reel configuration on a video display. Video slot machines typically offer the same types of features as their mechanical counterparts, and often add in a bonus game that occurs when a game results in a particular symbol combination. In certain slot machines there may be combinations of symbols that pay the player that are not necessarily confined to paylines, such as "scatter" pays which may be awarded when certain symbols appear in any visible position on certain reels. There have been games that do not have any paylines, but rather, pay for symbol combinations wherever they occur (e.g. "Spin Keno", U.S. Ser. No. 10/090,685).

There have been games where, after certain initial results, a random event modifies this result. This has been seen in games with a "respin" feature, such as IGT's "Double Spin Double Diamond". In that game, at the end of each initial game spin, if changing the third reel could possibly improve the result without the risk of a lesser result, then the third reel is respun by selecting an additional random number.

There have been games where the final result is modified after the spin in a non-random manner. For example, this has been done using a "nudge" feature (e.g. "Double Diamond Deluxe" by IGT) where certain symbols will rise to the payline when they appear below the payline, or other symbols will fall to the payline when they appear above the payline. There have been other games where the player is allowed to "nudge" certain reels after the result to attempt to modify the original result to a better result.

There is a multi-line video slot machine ("Penguin Pays" by Aristocrat) where, after a certain symbol combination is achieved, then a certain symbol is sequentially substituted for each of the fifteen symbols. After each substitution, all paylines are evaluated and the player is paid for all winners in each evaluation.

SUMMARY OF THE INVENTION

In broad perspective of a primary aspect of the current invention, the gaming machine creates a random original (first) result. This first result is evaluated, and then, according to specific rules, certain game element symbols are transformed, the remaining elements are rearranged, if permitted, and the new arrangement is then evaluated. This process of transforming, rearranging, and re-evaluating is repeated over and over until no further play is available.

Now, with the foregoing in mind, the current invention builds upon this novel concept for a game that allows for wagering on the continuing process of a game. The present invention, in perhaps one of its broader expressions, comprises a game, as for a gaming machine, wherein a plurality of game element locations are displayed in a matrix. Game elements are provided, wherein the game elements are divided into subsets, each having their own matching relationship. The game is played by randomly assigning each game element to a game element location. This assignment (or "dealt hand") may or may not result in having all game element locations filled by game elements. A preferred form of the invention fills the matrix with game elements. The gameplay condition then presented is evaluated to determine if a positive outcome has been achieved.

That positive (or winning) outcome, in the preferred embodiments described hereafter, is a matching combination of plural game elements. It need not be a paying combination, however, as will be understood through further consideration of this specification.

If a positive outcome has been achieved, the positive outcome may or may not have a payout associated with it. However, if a positive outcome has not been achieved, then the game is typically over. Continuing on, if a positive outcome has been achieved in the initial gameplay condition, the positive combination(s) is transformed according to specified rules.

The transformation includes removing at least one game element from the previous positive combination, thus creating an open space. The transformation may further include injecting a "Wild" game element in place of a game element in the previous positive outcome. The remaining game elements are then rearranged, if possible, according to a movement methodology. The steps of evaluating, transforming, and rearranging the game elements are repeated so long as there is a positive outcome.

Another objective encompassed in the invention is having positive combinations as three or more contiguous game elements with a matching relationship. A transformation step is disclosed wherein all game elements of a positive combination are removed from the matrix, thus leaving additional open spaces (game element locations).

Yet another variant objective is to include a transformation step wherein, if the positive combination is exactly three game elements, then all game elements are removed except the middle game element, which is transformed into a "Wild" game element. The "Wild" game element has the attribute of matching some or all of the other game element indicia. As such, a positive combination in this embodiment can include: three or more game elements with the same indicia; or one or more game elements with the same indicia with appropriate substitution of "Wild" game elements to achieve three or more matching game elements, or any other conceivable, transformable game element concept.

Still another objective of the present invention is the use of an initial wager on an outcome in gameplay. In one such wagering game, the player is then paid for positive combinations according to a paytable having a structure of payouts for obtaining positive outcomes. It should be noted that a positive outcome may have a payout of zero, with the player nonetheless advancing to a subsequent gameplay condition (sometimes referred to herein as another "level").

In one aspect of the invention, the player can specify the number of game elements involved in the first gameplay condition, such that less than all of the game element locations are used (filled with game elements). Each possible number of game elements employs a different paytable. In one form of this version, the player selects certain game element locations (or "spots" as sometimes referred to herein) from a larger number of game element locations as the number of game element locations to play and upon which the outcome is based. The more game element locations (spots) that the player selects, the higher the possible payouts. Alternatively, the game elements are simply randomly assigned to locations.

The invention in one preferred embodiment uses a game matrix comprised of adjoining orthogonal rows and columns of game elements locations within the bounds of a rectangle wherein the positive outcome is met by contiguous matching game elements in any row or column of the matrix. The positive outcome could likewise be simply some number of contiguous matching game elements, or even some number of game elements in a so-called "scatter-pay" arrangement.

Another embodiment uses a game matrix wherein the game element locations are defined by segments of a set of concentric rings. In this form of the invention, the positive outcome can be combinations of matching game elements in any "row" or "column" of the concentric rings. Using this type of game matrix, the movement methodology can be defined as toward the common center of the concentric rings, or toward the outward ring for that matter, just to name two ways of movement.

While some kind of movement to fill spaces is contemplated, the described embodiments of this invention generally include a movement methodology with a game boundary towards which the remaining game elements are moved as permitted.

Yet another objective of the invention includes a method of randomly assigning game elements to game element locations in multiple "reel-type" arrangement. This type of selection method includes a random selection from a full set for each game element location. This is contrasted with the single set ("deck") used for the entirety of the game elements locations.

One form of the invention is a method of playing a wagering game. The game is played by providing a game matrix with a plurality of game element locations. Game elements with differing subsets of game elements with matching relationships are provided. A wager upon the outcome of the game is made. The game elements are then randomly assigned to game element locations for a first gameplay condition. The first gameplay condition is evaluated for a matching relationship for a winning outcome.

The "matching" relationship includes two but preferably more associated game elements. The matching relationship could also include a single game element, such as a special game element which permits the transformative step to occur.

The winning outcome is then transformed by eliminating at least one game piece of the winning relationship to create at least one open space.

The remaining game elements are then moved, if possible, according to a movement methodology. The movement methodology can include any well-defined movements such as moving each game element towards the bottom of a matrix of rows and columns, if possible, to fill any empty space. However, the movement methodology could include moving towards a side, or alternating between which side to move toward, or towards the top of the matrix. Likewise, the movement methodology could include randomly determining which remaining element will fill a blank space, if possible. The new arrangement comprises the next or subsequent gameplay condition.

The steps of determining a matching relationship for a winning outcome, transforming, and moving the game elements are repeated so long as there is a matching relationship for a winning outcome with further movement. After continued gameplay has ceased, a total payout is determined according to a paytable with a hierarchy of awards for the different matching relationships attainable and those actually attained during gameplay.

Additionally, the invention could have a payout wherein each payout for a subsequent gameplay condition is multiplied. For example, the first payout on the first gameplay condition would be multiplied by one, the second payout on the second gameplay condition would be multiplied by two, etc. The invention could use this or any other method of increasing payouts as the number of gameplay conditions increase.

The invention also contemplates a video gaming machine having a video display on which the game matrix is located or shown. The video gaming machine includes a wager input mechanism. An operating system is included in the video gaming machine. The operating system includes a methodology for gameplay establishing a plurality of possible predetermined positive outcomes of game elements in matching relationships. The video gaming machine includes a mechanism for randomly placing game elements in respective game element locations for gameplay. A paytable is also included in the video gaming machine. The paytable has a set of structured payouts for achieving various positive outcomes.

The operating system makes an evaluation of the gameplay condition, and determines whether any positive outcome was achieved. A transformation of the game elements which comprise any such positive outcome occurs including an elimination of at least one of the game elements of each positive outcome to thereby create an open space for that game element location. Next, if any remaining game element can be moved according to a movement methodology, it is so moved. This movement methodology is designed to fill any open space that may have been created. This process of evaluation and so on repeats until there is no longer a positive outcome for continued gameplay. Gameplay ends with rewarding positive outcomes (if any) according to the paytable and the wager.

The foregoing video gaming machine could include a reward for every positive outcome and the awards could be accumulated for a final payout. The video gaming machine could include a game element selection mechanism used by a player to select which game elements are to be used in an initial gameplay condition (i.e., less than all).

The matching relationship for the positive outcome can include at least three game elements with associative indicium in a subset. The positive outcome could include the three or more game elements in a certain geometry. For one instance, the three game elements may be required to be contiguous in a line for a transformation, and the transformation includes elimination of all game elements of the positive outcome. Alternatively, a middle game element of the group is transformed into a "Wild" symbol. The "Wild" symbol has the attribute of matching a plurality of other game element indicia. Additionally, the video gaming machine can include a structure of payouts for positive outcomes including increasing the payout for each repetition through transforming and movement.

The video gaming machine could use a matrix of game element locations organized by orthogonal rows and columns wherein the positive outcome is from a row or column having contiguous matching game elements thereon. Likewise, the video gaming machine could include a boundary towards which the movement methodology moves the remaining game elements. As such, the movement methodology could move the remaining game elements towards the bottom, for instance.

The invention also includes a method of operating a gaming machine with the steps of providing a game matrix having a plurality of game element locations, providing a set of game elements, registering a wager, randomly assigning game elements to game element locations for a gameplay condition, determining if any of the game elements are to be transformed, and transforming the game elements so designated. The transformation preferably includes the elimination of at least one game element, thus creating an open space. Any remaining game elements may be moved to fill an open space according to a movement methodology.

When movement stops, there is then another determination as to whether any remaining game elements can be transformed, repeating the above transformation step, moving step, and determination step so long as there is a transformation for continued gameplay unless some other criterion stops the game. A payout is then made according to a paytable.

The aforementioned method of operating a gaming machine could include the previously described attributes and variations such as eliminating all game elements to be transformed, eliminating all but a middle game element of the elements to be transformed and changing the middle game element into a “Wild” game element.

As previously described, the transformative act can be based on at least two game elements which have an associative relationship being contiguous in the game matrix for the transformation, or in the myriad other arrangements contemplated, including a solitary “special” game element which meets the transformation step. The method of operating a gaming machine likewise may utilize a paytable which has a structure of payouts that is increased for each repetition through transformation and movement. The paytable can be preferably based upon a hierarchy of differing subsets of game elements.

The invention also contemplates a game having a game matrix of a plurality of game element locations, and a set of game elements. A random assignment of game elements to a respective game element location occurs for a first gameplay condition. A preset game methodology determines whether any of the randomly assigned game elements in the first gameplay condition comprise a game element subject to transformation. If so, there is a transformation of the game elements subject to transformation, the transformation including an elimination of at least one of the game elements so transformed to thereby create an open space for that game element location of said eliminated game element. After transformation, there is a determination of whether the remaining game elements can be moved according to a movement methodology designed to fill an open space created, with movement of any such remaining game element(s) as permitted by the methodology for a subsequent gameplay condition. There then ensues another determination according to the game methodology of whether the game elements in the subsequent gameplay condition are subject to transformation, and if so, transformation and movement ensues for continued gameplay, toward ultimately determining an outcome.

As with other embodiments already discussed, the transformation of the aforementioned game can include elimination of game elements subject to transformation. The game elements can further include subsets of game elements which have an associative relationship within each subset. The game methodology may require at least three game elements which have an associative relationship be contiguous in the game matrix for the transformation. The transformation further may include eliminating matched game elements, or all but a middle game element of the match, with changing of the middle game element into a “Wild” game element which has the attribute of matching with a plurality of game element subsets.

The game could also include a wager register and a paytable, which provides a reward in view of the outcome. The paytable can have a structure of payouts for gameplay as previously discussed.

The matrix of game elements of the game can form adjoining orthogonal rows and columns, which establish the game element locations, and the transformation requires that contiguous game elements be in a column or in a row. The game matrix of the game can also include a boundary toward which the movement methodology moves remaining game elements.

The invention further contemplates a bonus for a gaming machine wherein the gaming machine has a base game with game elements in game element locations, and at least some of the game elements are subject to being eliminated in play of the base game. The bonus comprises: a plurality of bonus indicia in a predetermined bonus association, wherein the bonus indicia are placed in respective game element locations and at least one of the bonus indicia is in an unachieved mode relative to the game elements. The unachieved mode is established by a game element being located on the same game element location as a bonus indicium. An achieved mode for the bonus is when all of the bonus indicia in a bonus association are no longer located in the same game element location as a game element.

The contemplated bonus for a gaming machine may include the unachieved mode comprising a game element obscuring a bonus indicium from view, and the achieved mode is all of the bonus indicia in an association no longer being obscured. In another embodiment, the bonus indicia in an association are contiguous in a line on a matrix of game element locations.

In yet another embodiment of the bonus, the matrix of the game may be comprised of rows and columns, and the bonus indicia in an association are equal in number to game element locations of a respective row or column and the achieved bonus mode constitutes open spaces throughout a respective row or column having said bonus indicia.

These and other objectives and advantages achieved by the invention will be further understood upon consideration of the following detailed description of embodiments of the invention taken in conjunction with the drawings, in which:

DETAILED DESCRIPTION OF EMBODIMENTS OF THE INVENTION

The "Chain Reaction" game, as we call it, is preferably played on a gaming machine. While it is implemented on a video gaming device in that application, it could be developed to operate in a mechanical form that could be as a mechanical gaming machine, or a live game such as a casino table game. There may also be practice programs developed to play the game on a personal computer, for instance.

In a presently preferred embodiment, the gaming device displays the game elements as symbols to the player in a traditional rectangular grid or matrix, such as a five by five square. The symbols could be shown in other rectangular dimensions or for that matter, many geometric arrangements without departing from the invention.

The basic concept for the preferred embodiment is as follows: at least some symbols in winning combinations disappear from the game matrix in a transformative step, which may include some symbols in the winning combinations transforming into a different symbol. After this removal and any substitution, symbols are then rearranged (such as being compressed downward in the columns of the foregoing square matrix) to fill in any blank spaces. This could be thought of as if each symbol was a block (cube) and the symbols that disappear cause the blocks above them to fall under gravity in their place(s). A "winning" arrangement can also be a "positive" result. As noted above, the "arrangement" can merely be a special game element appearing. The point is, something occurs that triggers a transformative process to advance the gameplay.

Figure 1:
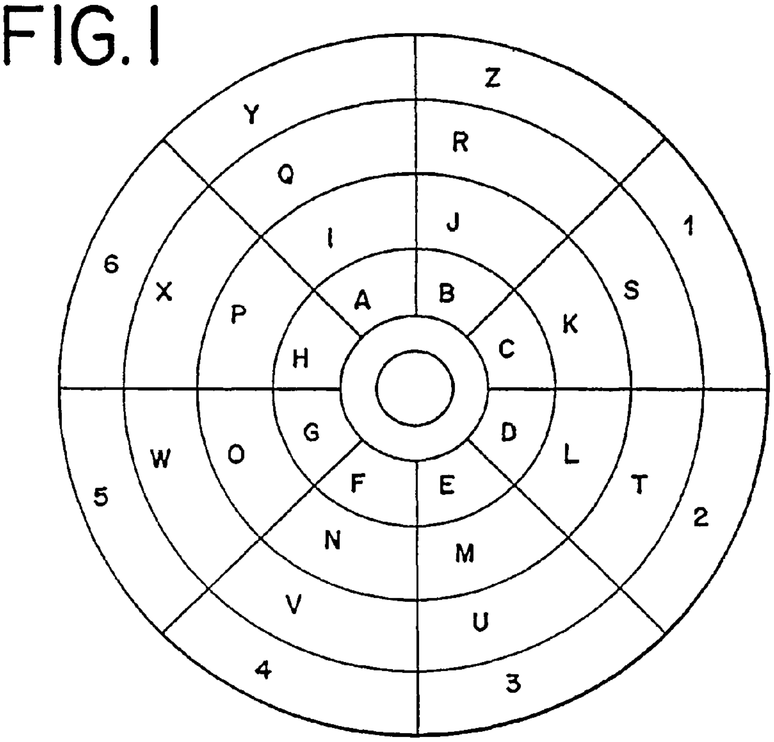
FIG. 1 is an illustrative configuration of an embodiment of the invention.

While the foregoing rectilinear geometry and attendant movement rule is used for a preferred embodiment, other geometries and rules could apply. For example, the symbols could be initially displayed in the circular matrix shown in FIG. 1. FIG. 1 is an arrangement of rings or concentric rows in a layout forming eight radial sections containing four symbols each, with the symbol positions labeled A to Z and 1 to 6. Such a configuration could use a physics model as was described for the rectangular grid. For example, there could be a gravitational "pull" in the center that would have outer pieces move toward the center into any permitted vacant spots. Conversely, the circle could be a wheel that spins after each evaluation, sending the pieces outward using centrifugal (inertial) force. Alternatively the symbols could rotate clockwise or counter-clockwise to reconfigure after symbols are removed, and so on. It is not important what the rules of movement are, so long as they are well defined to be implemented by the gaming machine and understood by the player.

Figure 2:
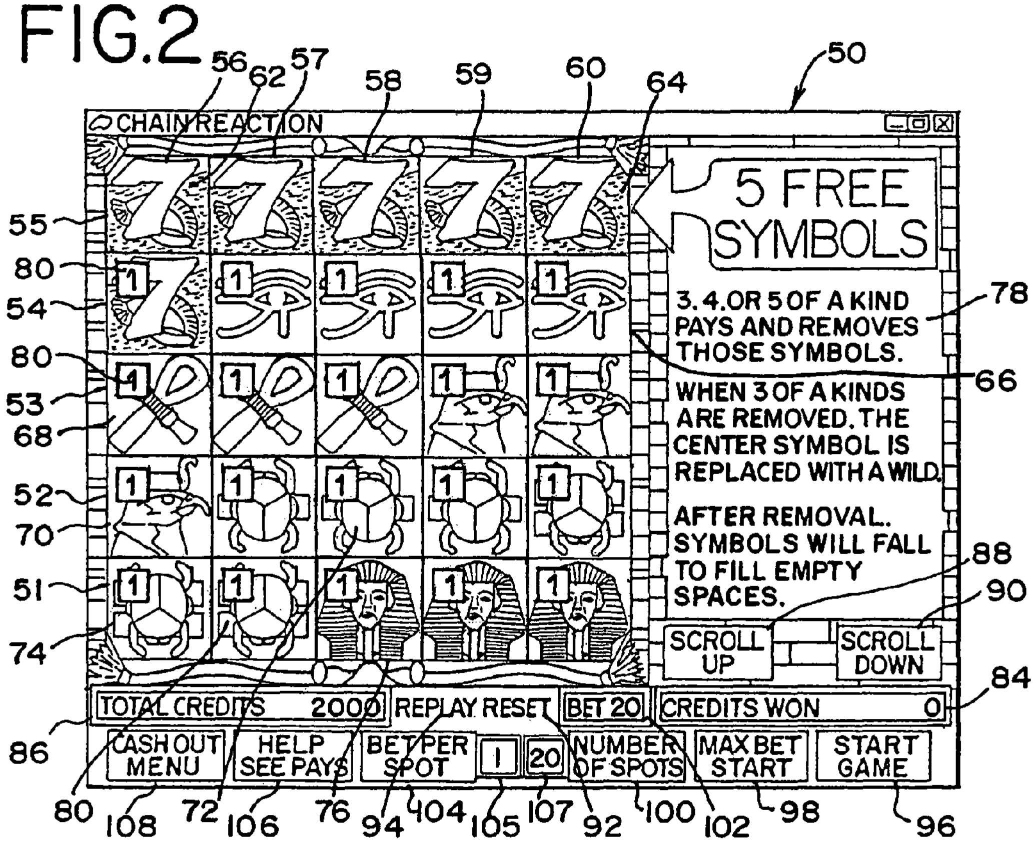
FIGS. 2 and 4 through 7 are various video displays showing another embodiment of the invention.

Returning to the first preferred embodiment, FIG. 2 shows a five by five grid of the game 50. The grid is comprised of five rows 51, 52, 53, 54, 55 and five columns 56, 57, 58, 59, 60. When each game is played, there are many possible ways for the CPU to randomly determine which symbol is shown in each position. For example, there could be a "slot reel" defined for each position that allowed for different probabilities of the occurrence of different symbols of a complete set, as is used in the "Spin Keno" invention of U.S. Ser. No. 10/090,685, incorporated herein by reference. Another possibility is to use the model of a "deck of cards". Each virtual "card" would contain one symbol, and the program would randomly pick cards from this deck and place them in the symbol array. When the "slot reel" methodology is used, the results at each symbol position are independent of the results at other symbol positions. For example, while astronomically unlikely, you could get the same symbol in every symbol position. When the "deck of cards" methodology is used, there are dependencies on the selection of one symbol to the next. For example, if all four "Eye" symbols of the "deck" have appeared in the first symbols drawn, then there is no chance of an "Eye" symbol appearing in a later symbol selection.

The "reel" methodology and "deck of cards" methodology are well known in the art. It is not particularly important whether one of these, or yet another methodology, is used for the symbol selection in this invention.

In this first embodiment, the "deck of cards" methodology is used. While the "deck" could be comprised of more than the twenty-five symbol positions, such that twenty-five symbols are drawn from this larger deck for each game (just as Stud Poker draws five cards each game from a fifty-two standard card deck), in the preferred embodiment the "deck" or set of game elements consists of the twenty-five symbols shown in FIG. 2. This embodiment of the game uses symbols with an Egyptian theme. The symbols are organized in subsets of matching symbols (i.e., with common indicia in a subset): "Red 7's" 62 (light colored), "Blue 7.'s" 64 (dark colored), Eye 66, Ankh 68, Hawk 70, Silver Bug 72 (facing upward with one horizontal bar in the background), Gold Bug 74 (facing downward with two horizontal bars in the background) and King Tut 76. It is well known in the art that any suitable theme or set of symbols could be adapted for the game without departing from the invention.

It is a common practice in gaming machines to give the player multiple ways to wager multiple credits on each game played. In reel slots, this is usually accomplished by providing many different paylines, each of which requires a wager. In the "Spin Keno" application, this is accomplished by allowing the player to select one or more symbol positions with which to wager. In the current invention, this may be provided in a number of ways. For example there could be ten paylines for the rows 51, 52, 53, 54, 55 and columns 56, 57, 58, 59, 60 in the grid, with wins only being awarded when they occur on lines that have received a wager. Alternatively, the player could have the option of wagering one to twenty-five credits to activate each of the twenty-five squares in the grid, with wins only being awarded that contain a symbol in a square that has been wagered upon. This could be modified so that wins are only paid when they are entirely contained in squares which have been wagered upon. In the embodiment shown in FIG. 2, a bet indicator 80 is also shown in each square (game element location) to indicate which squares have a bet or wager. In this case, a player has wagered one credit on each square of the bottom four rows 51, 52, 53, 54. This is accomplished using the "Number of Spots" button 100 and registered in the associated meter 107. The number of credits (coins) per spot played could be changed for the wager, once again also then being reflected in indicators 80. The player could bet up to five credits per spot. This would be accomplished using the "Bet Per Spot" button 104 and registered in its associated meter 105. The limit of five credits per spot is arbitrary and may be changed without departing from the invention.

Figure 3:
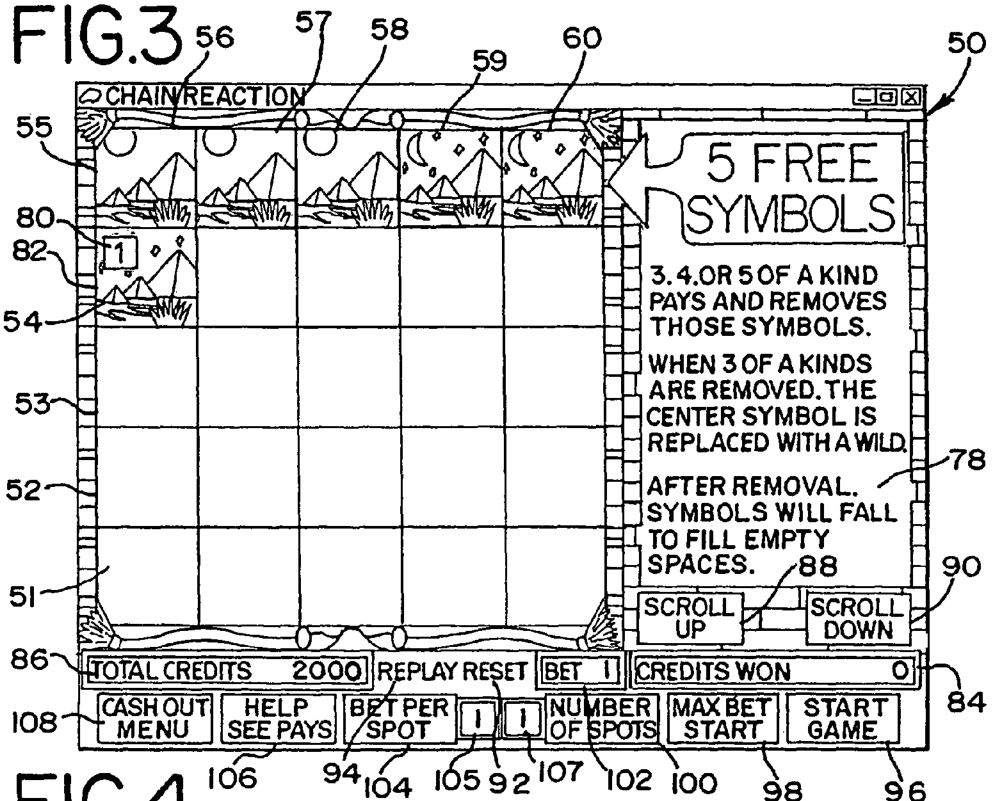
FIG. 3 is a video display of a screen using different symbols than the foregoing version.

There is no limit to the methods that could be used to encourage higher bets by providing more action in the game. In this preferred embodiment, however, the player is given five free symbols as indicated in the information area 78. The player may wager one to twenty credits for one to twenty additional symbols, for a maximum of twenty-five symbols (one for each position in the grid). If less than twenty credits is wagered, the extra symbols are replaced with blank symbols that are not part of any winning paytable value. FIG. 3 shows the game screen when only one credit is wagered:

selecting square 82 (in addition to the five free squares) providing six paying symbols and nineteen blank symbols.

It will be noticed that the symbols shown in FIG. 3 are different from the symbols shown in FIG. 2. This was done simply as another example of symbology.

When one credit is played, it would have been acceptable to use the first six symbols of FIG. 2 and provide "Red 7's" and "Blue 7's" as the symbols without departing from the invention. To do this would have required a change in the paytable values to achieve the desired return percentage, however. In this embodiment, it was deemed favorable to keep all of the paytable values constant (for three "7's", four "7's" etc.). This is accomplished by changing which symbols are in play for a given number of "played" symbols.

The following paytable was used for twenty symbols used in play (i.e., Five free "7's" and twenty other game elements for the five by five matrix):

TABLE 1

| Occurrence | Pays |
|---|---|
| 5 Wilds | 1000 |
| 4 Wilds | 300 |
| 3 Wilds | 25 |
| 5 King Tut | 300 |
| 4 King Tut | 100 |
| 3 King Tut | 10 |
| 5 Red 7's | 100 |
| 4 Red 7's | 45 |
| 3 Red 7's | 15 |
| 5 Black 7's | 100 |
| 4 Black 7's | 35 |
| 3 Black 7's | 8 |
| 5 "Any" 7's | 40 |
| 4 "Any" 7's | 10 |
| 3 "Any" 7's | 5 |
| 5 Gold Bug | 100 |
| 4 Gold Bug | 30 |
| 3 Gold Bug | 6 |
| 5 Silver Bug | 100 |
| 4 Silver Bug | 20 |
| 3 Silver Bug | 4 |
| 5 "Any" Bug | 25 |
| 4 "Any" Bug | 10 |
| 3 "Any" Bug | 3 |
| 5 Hawk | 70 |
| 4 Hawk | 15 |
| 3 Hawk | 5 |
| 5 Ankh | 50 |
| 4 Ankh | 10 |
| 3 Ankh | 3 |
| 5 Eye | 30 |
| 4 Eye | 5 |
| 3 Eye | 2 |

Figure 4:
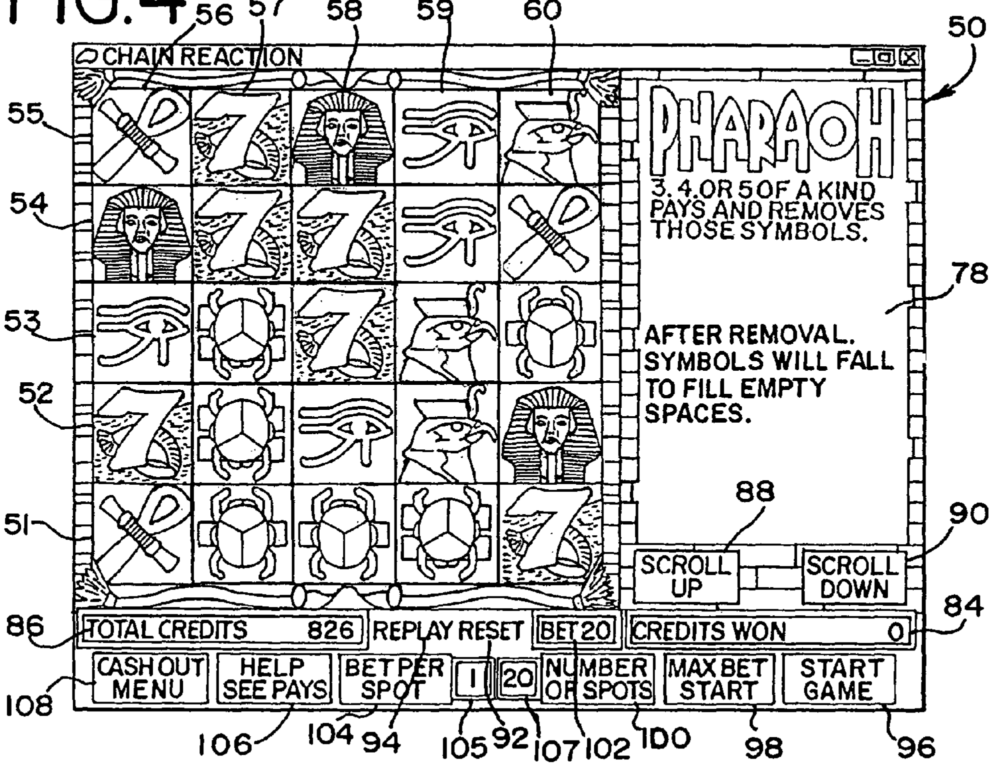

FIGS. 4 through 7 show a sample game in this embodiment. In FIG. 4, we see the initial "deal" of the twenty-five symbols. "Deal" as used herein, and made self-evident above, is simply the display or symbols in randomly-selected game element locations, as if "dealt" from a shuffled "deck". The program uses a Random Number Generator (RNG), as is well known in the art, to randomly assign the twenty-five symbols from the total set (or less if not all are selected) to the twenty-five symbol locations used in this embodiment (or less if all game elements are not selected).

The symbols may be revealed to the players in any desired animated fashion, such as dropping them from over the board as if they were tiles. FIG. 4 shows one possible starting or first arrangement for these "dealt" symbols.

Once the symbols have been displayed in a gameplay condition, the program identifies any winning combinations. In this embodiment, any group of three matching symbols that appears on consecutive (contiguous) horizontal spaces (rows) or vertical spaces (columns) on the board is considered a winning combination, of course, if that combination is listed on the paytable. Any other rules for winning symbol alignment including using more or less symbols for winning combinations may be used without departing from the invention.

Here "matching" means having a common indicium, such as an Eye symbol, or a Bug. "Matching" as further revealed herein can also include a "Wild" symbol as part of the winning association or outcome. "Matching" may further include some kind of common associative theme for the subset, such as a "flower" motif using various flowers for one subset, various "sheep" pictorials for another, kinds of "bees" for a third and so on. "Matching" is thus used expansively herein to connote some pre-determined associative relationship, with or without "Wild" elements. Again as noted above, there need not be any "match" of plural game elements at all if a "special" game element meets the criteria for winning combinations.

In FIG. 4, there are two winning combinations: 1) the lower three symbols of the second column 57 comprising an "Any Bug" combination that is worth three credits; and 2) the second, third, and fourth symbols on the first row 51 comprise another "Any Bug" combination that is also worth three credits.

Figure 5:
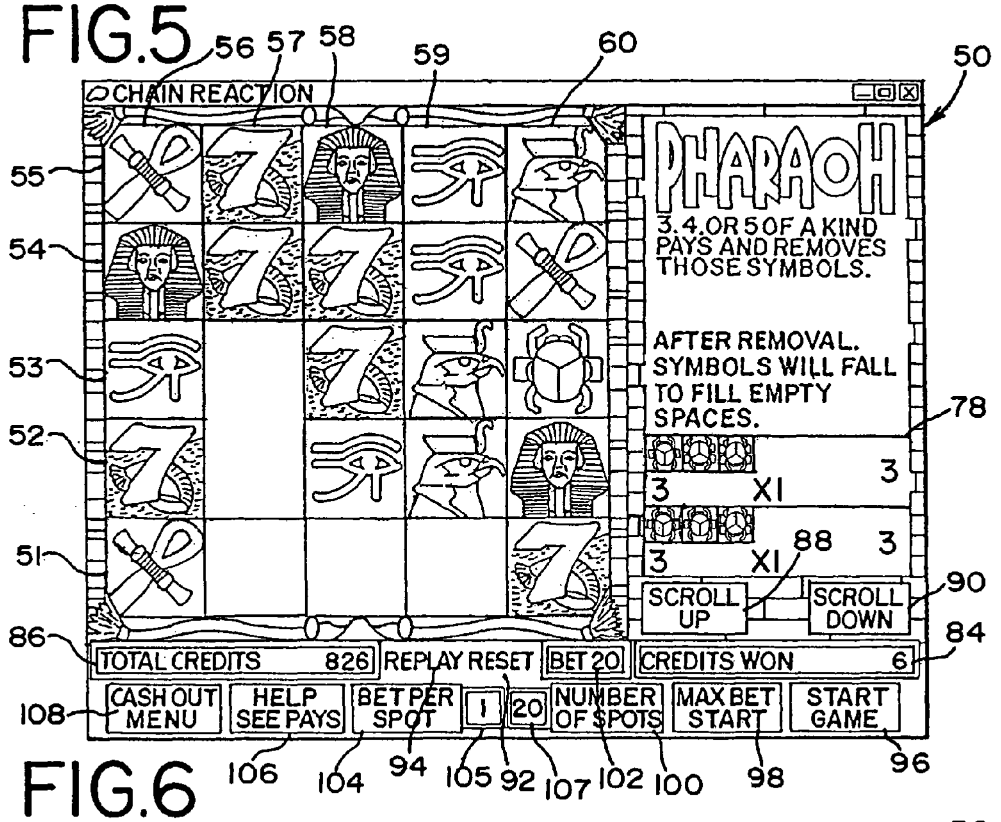
Figure 6:
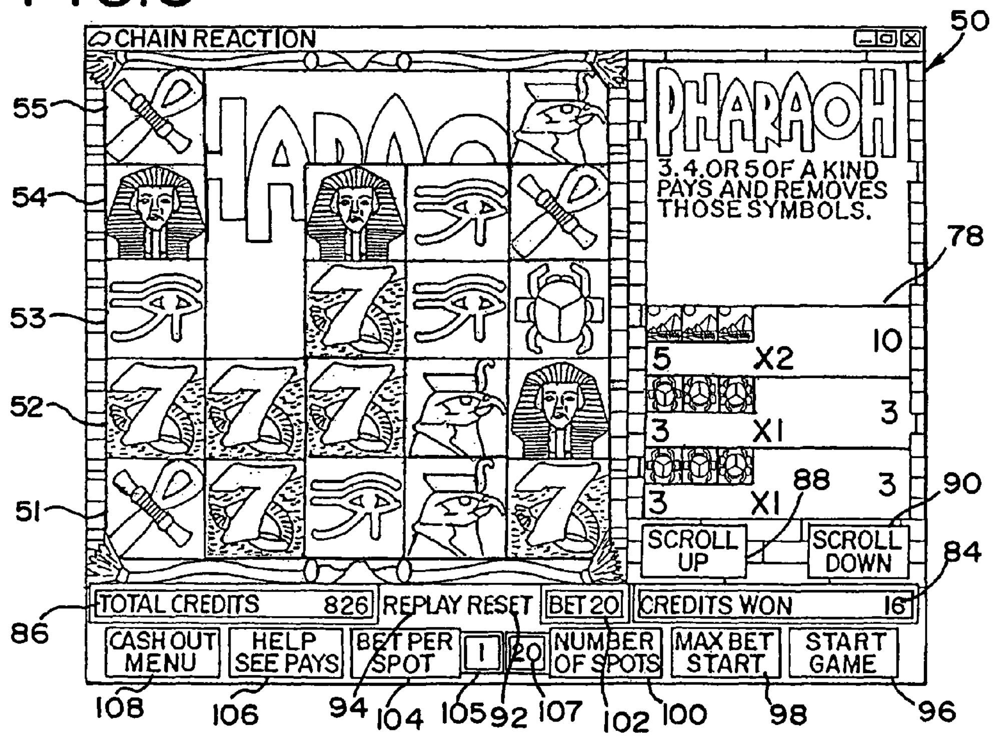

In FIG. 5, the information area 78 displays each of the "Any Bug" combinations, which show a payout of three credits, and a multiplier of one (×1) for a total of three credits for each combination. The "Credits Won" meter 84 is updated to display the six credits won. In this embodiment, each time a board is evaluated, the multiplier increases by one (1×). This first evaluation thus awards all paytable values at 1×. The second evaluation (discussed below) uses a multiplier of 2×, and so on. Modifications of the pay values on each evaluation levels of the game are possible without departing from the invention, such as different multipliers could be used, or no multiplier could be used.

In FIG. 5, the display is shown in the process of removing all of the symbols that appeared in winning combinations. This is what we call a transformative step or operation, as the game element disappears from play. As will be further revealed hereafter, transformation includes changing into a "Wild" symbol. Conceivably, other embodiments could include transforming into something else, like a randomly selected symbol. The program then rearranges the remaining symbols such that all symbols above empty spaces move down, as if the removed symbols were holding them up into place (see FIG. 6). If there was no rearrangement possible, the game would be over. Since there is some movement, the program again scans the rows and columns for more winning combinations. The second row 52 now contains a "Blue 7", a "Red 7", a "Blue 7", a Hawk, and a King Tut. The first three symbols are a three "Any 7's" combination which pays five credits. The program displays the "Any 7's" combination, as well as the five credit payout, and the multiplier ×2 in the information area 78. The "Credits Won" meter 84 is updated to display the sixteen credits won from the three winning combinations (3+3+10). The three "7's" are highlighted and will be removed (transformed), allowing the symbols above it to fall.

Figure 7:
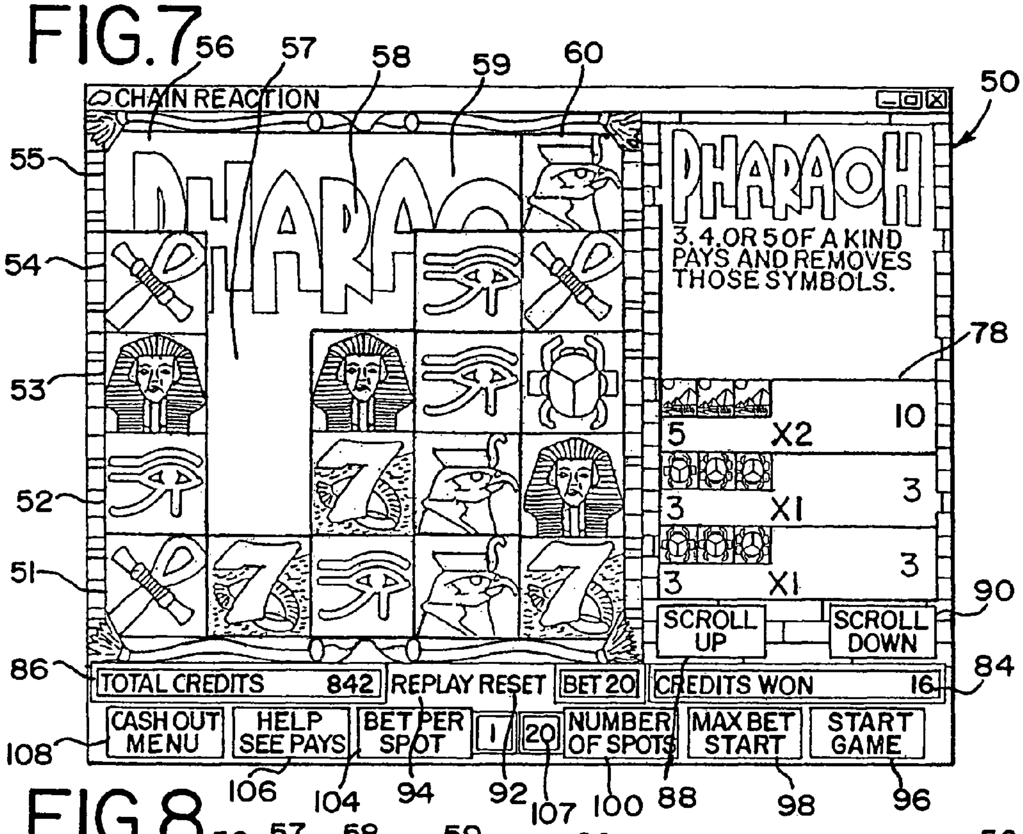

The board is evaluated for a third time, as shown in FIG. 7. If there were any winning combinations in this board they would have been paid with a 3× multiplier, and the rearrangement and evaluation would have continued. In the display of FIG. 7, however, there are no winning combinations, so no further arrangements are possible, and the game is over. The sixteen credits that were "won" are added to the "Total Credits" meter 86 bringing the total credits to 842.

Sometimes a player may achieve many winning combinations, resulting in an "overflow" condition of information in the limited information area 78. A "Scroll Up" button 88 and a "Scroll down" button 90 can be included to allow the player to review all the winning combinations. Other possible features include a "Reset" button 92 and a "Replay" button 94. The "Reset" button 92 allows a player to redisplay the initial deal or play for further review. The "Replay" button 94 allows a player to replay the previous deal and re-watch the evaluations.

The foregoing embodiment also includes features such as a "Start Game" button 96, a "Max Bet Start" button 98, a "Number of Spots" button 100, a "Bet" meter 102, a "Bet Per Spot" button 104, and a "Help See Pays" button 106. These types of features are well known in the art, and further description is unnecessary.

In another embodiment which is a variation on that just described, a "Wild" symbol is introduced to provide more action on more games. "Wild" symbols are widely used in gaming machines, and depending on the rules of the particular machine, may substitute for a single type of symbol, a group of symbols or any symbol. While any of these configurations is compatible with this invention, the "Wild" in these examples are matches for any symbol. Furthermore, in any given evaluation, a "Wild" symbol may be a match for one symbol in a first paying combination and "Wild" for a different second symbol in a different paying combination.

In this embodiment, initially there are no "Wild" symbols in the deck of symbols, however, anytime a paying combination is comprised of exactly three symbols, instead of removing all three symbols from the board after evaluation, the outer two symbols are removed, while the center symbol is replaced with a "Wild" symbol. "Wild" symbols could also be substituted when four and/or five symbol winning combinations are removed without departing from the invention. Obviously, some convention could be used to determine where the "Wild" would be placed in the transformation of a group without a central game element. The "Wild" symbols could also be part of the "deck" or injected by other means without departing from the invention.

Figure 8:
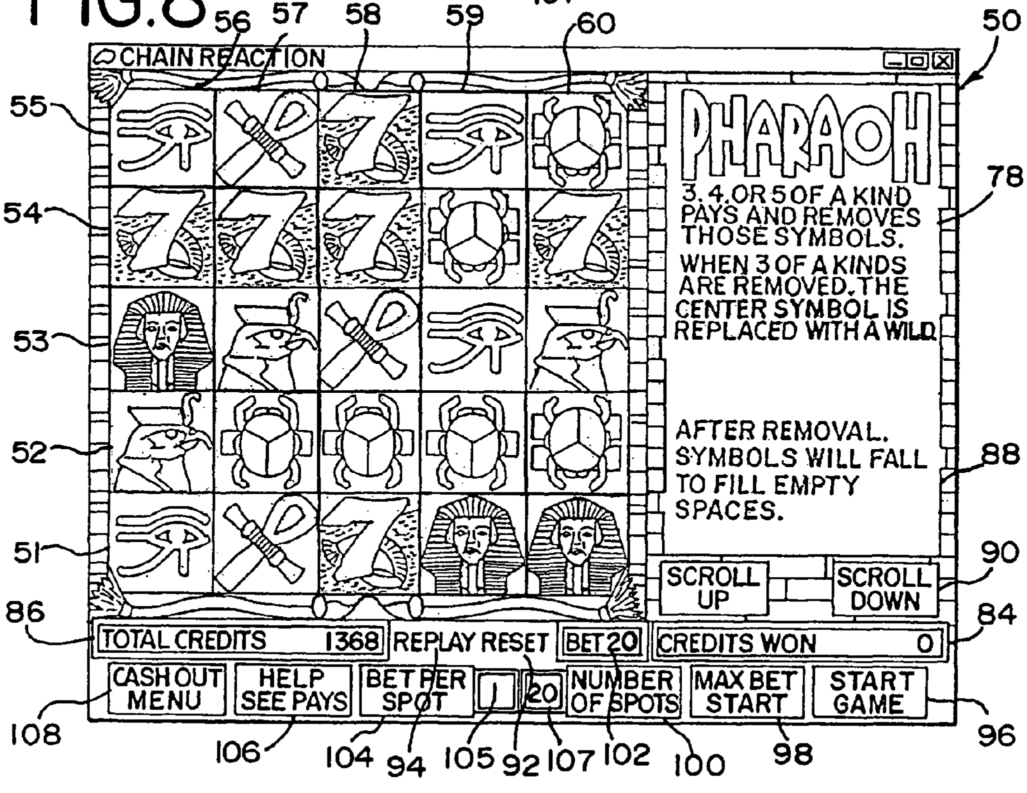
FIGS. 8 through 13 are various video displays showing a variation of the embodiment of FIGS. 2 through 7 of the invention.

FIGS. 8 through 13 illustrate this embodiment of the invention, which includes the "Wild" symbols. FIG. 8 shows the initial deal or gameplay condition of such a game. In this embodiment, if there are multiple winning combinations on a particular row or column, each winning combination is paid, but only the highest value symbol count in each pay group (of the eleven pay groups shown in Table 1) is paid. For example, when a player gets five "Any 7's", he or she would not also get paid for four "Any 7's" and three "Any 7's"; however if those five "Any 7's" contain three consecutive "Blue 7's" then there would be a pay for both five "Any 7's" and three "Blue 7's". One could also get paid for multiple combinations in the same group without departing from the invention.

Now returning to FIG. 8, the second row 52 contains a Hawk, a Silver Bug, a Silver Bug, a Silver Bug, and a Gold Bug. This includes the winning combinations of three Silver Bugs and four "Any Bugs". The fourth row 54 also contains a "Red 7", a "Blue 7", a "Red 7", a Gold Bug, and a "Blue 7" forming a winning combination of three "Any 7's".

Figure 9:
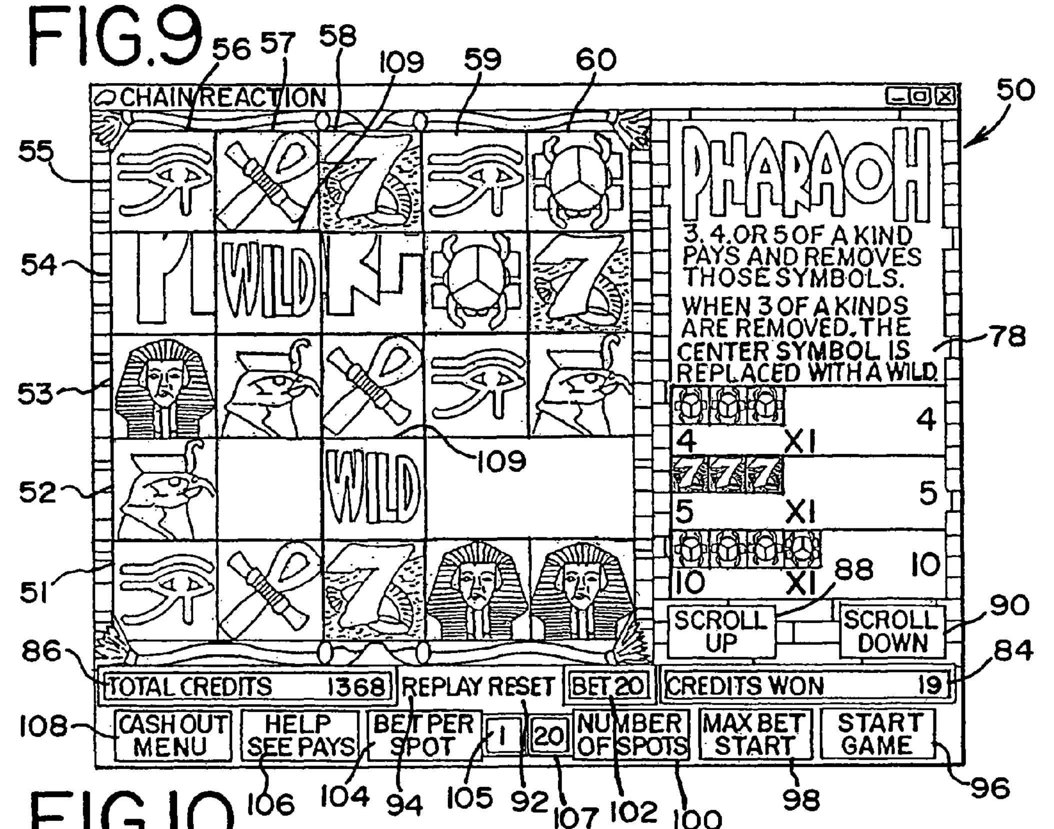

The program calls out these three winning combinations, shows their pay values (ten credits for four "Any Bugs", five credits for three "Any 7's" and four credits for three Silver Bugs), and displays this information in the information area 78 as illustrated in FIG. 9. The "Credits Won" meter 84 shows this 19 credit total. FIG. 9 also shows that all of the winning symbols from FIG. 8 have been removed, and the center symbol for each winning combination that contained three symbols has been replaced with a Wild symbol 109. Now, the symbols are rearranged such that symbols above empty spaces fall down into those spaces, resulting in the display shown in FIG. 10. In this embodiment, the symbols fall as if tiles or blocks "pulled" by gravity. However, the invention contemplates having the tiles rearranged toward the right, or the left, or upward, or toward the center column or a combination thereof. That is, some boundary is created toward which the game elements move (if possible), according to the gameplay methodology adapted. Here, the boundary is bottom row 51.

Figure 10:
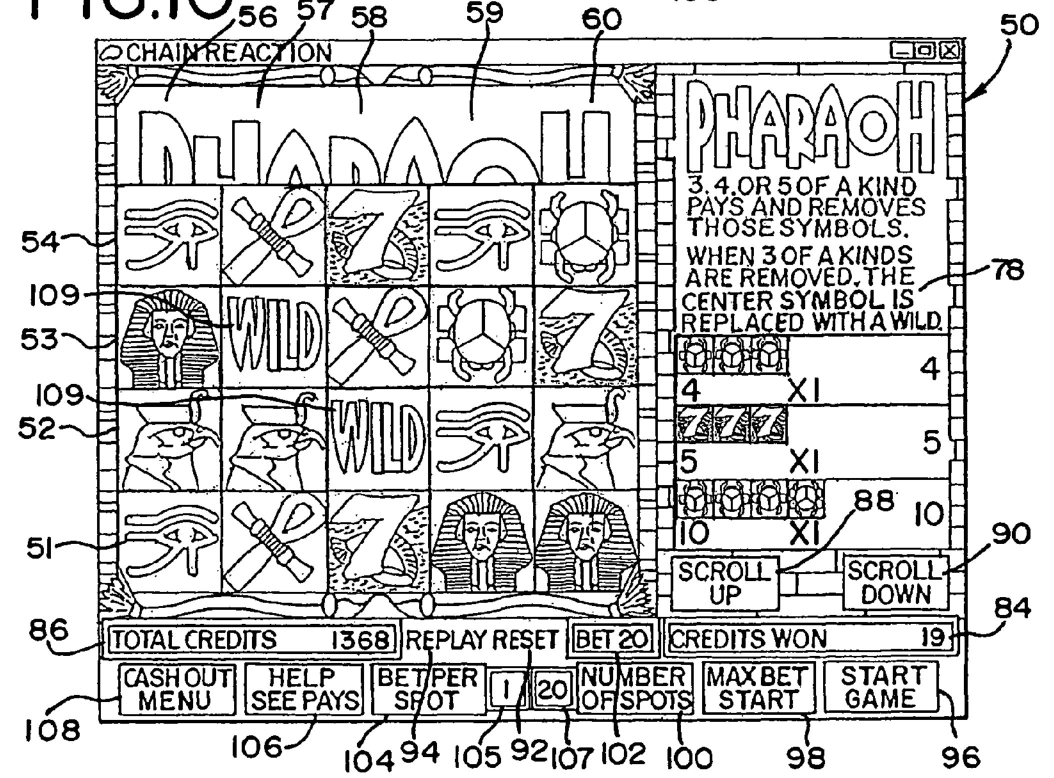

The program now evaluates the display shown in FIG. 10. The second row 52 is a "3 Hawk" winning combination using the "Wild" symbol 109 substituted as a Hawk.

Figure 11:
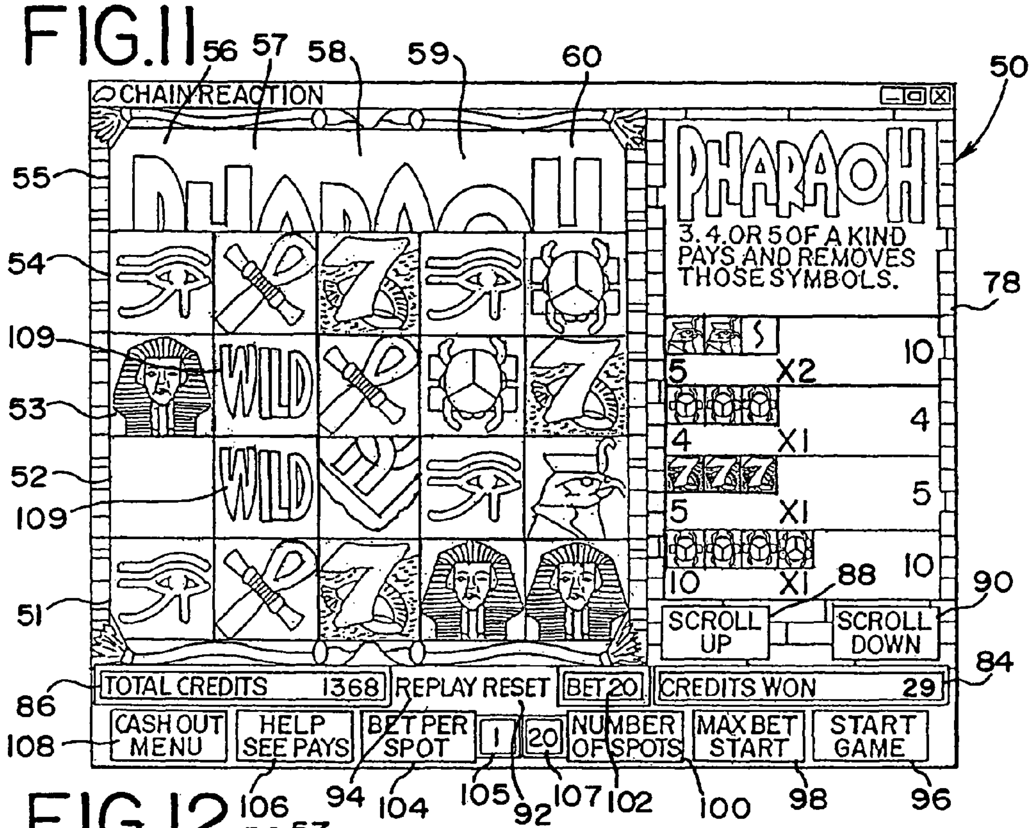

FIG. 11 shows that five credits have been awarded with a ×2 multiplier resulting in ten credits for this second evaluation, as is shown in the information area 78. This brings the total winnings for this hand to twenty-nine credits, as shown in the "Credits Won" meter 84. The two Hawks and the "Wild" symbol have been removed with a new "Wild" symbol 109 replacing the center symbol of the three symbol winning combination on the second row 52.

Figure 12:
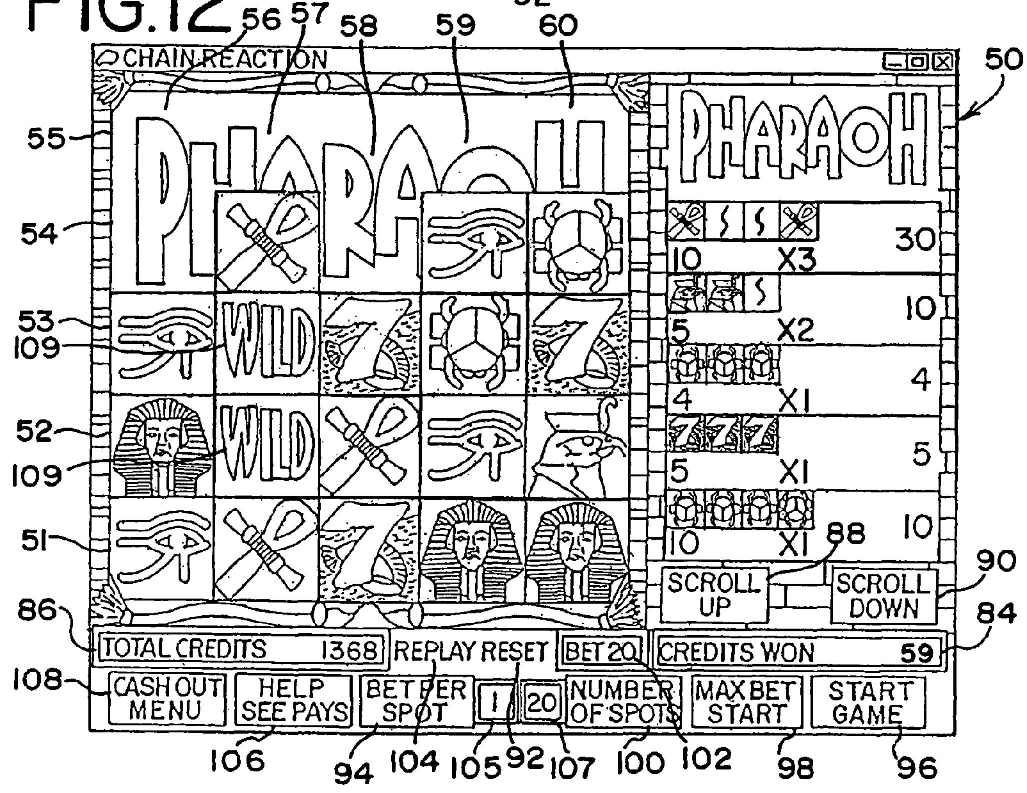

FIG. 12 shows this game after the rearrangement of the symbols. Now, the program finds that a four Ankh combination (Ankh, Wild, Wild, Ankh) in the second column 57 is the only winner. A ten credit payout times the third evaluation multiplier of three (×3) shows an additional thirty credits awarded in this evaluation giving a game total of fifty-nine credits, as is shown in the "Credits Won" meter 84. It's Party Time.

Figure 13:
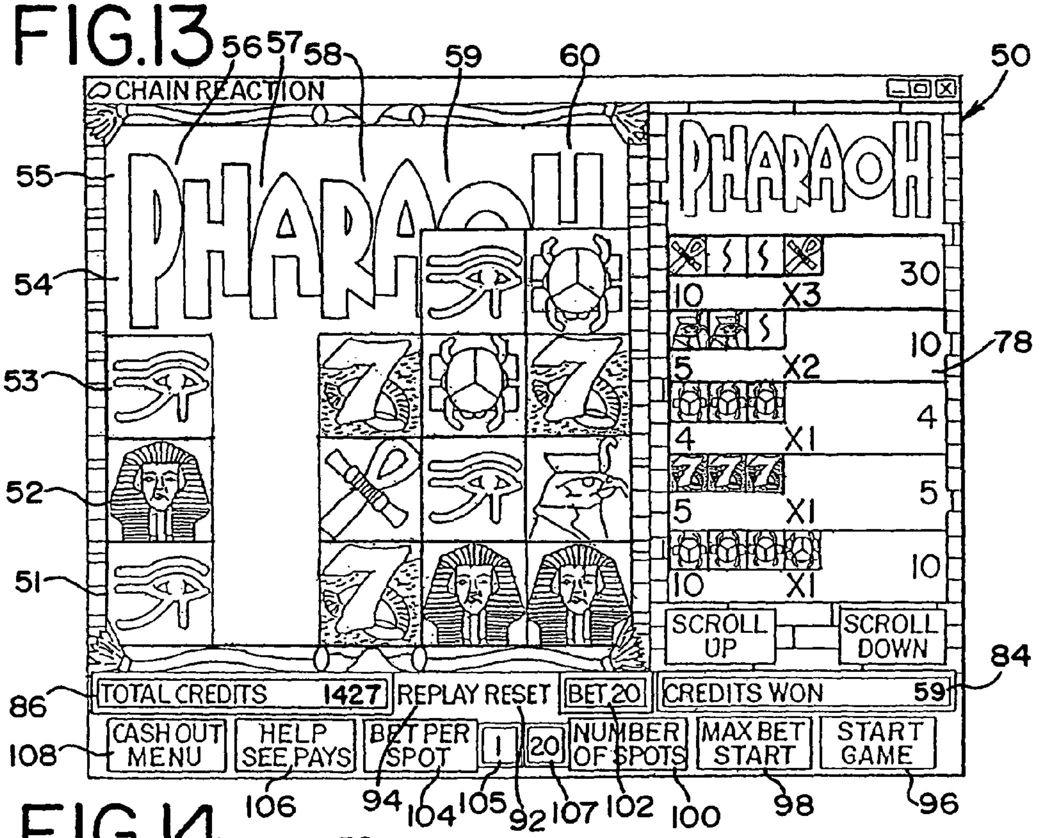

The winning symbols from FIG. 12 are removed without any substituting a "Wild" symbol substitution since this is not a three symbol winning combination. The final screen of this game is shown in FIG. 13. The program evaluates and finds no further winners, so the game is over. The fifty nine credits won in the game are added to the Total Credits meter 86 for a new total of 1427 credits. If there were one or more winners in FIG. 13, these would have been awarded with a 4× multiplier and the "Chain Reaction" play would have continued.

Bonus Game

It is currently very popular to have a special bonus game in games of chance. In some traditional slot machines, there are certain indicia that initiate a bonus round when they appear on a wagered payline. In other machines, the bonus is initiated by a special "scatter pay", which is defined as a certain combination or combinations of visible symbols, without regard to a particular payline. When a scatter-type pay is used, the bonus round is initiated when the combination appears, without regard to wagered paylines. The awards from a scatter pay bonus round are typically multiples of the entire wager of the initiating spin. Conversely, when a bonus round is initiated through particular symbols appearing on a wagered payline, the bonus is typically paid in multiples of the number of credits wagered on the specific line where the initiating symbols appeared.

A bonus game is not necessary, but may be added to the game of this invention in any of the conventional manners. An infrequent symbol combination such as four consecutive King Tut symbols on a payline could initiate the bonus game. Alternatively, the bonus game could be triggered using some quantity of scattered symbols. This configuration would work better if there were more symbols in the set than in the grid, or if the "reel" methodology was used.

An interesting approach is the initiation of the bonus game or round as a result of a particular geometric configuration.

For example, the bonus game could be awarded anytime a complete column is cleared, or whenever two adjacent columns are cleared. The bonus round could also be initiated if the top three rows are completely cleared.

However, in one preferred embodiment of a bonus game herein, certain columns are randomly signified as "Bonus Columns" at the start of each game. The bonus game is initiated any time a Bonus Column is cleared out, i.e. all game symbols removed.

Figure 14:
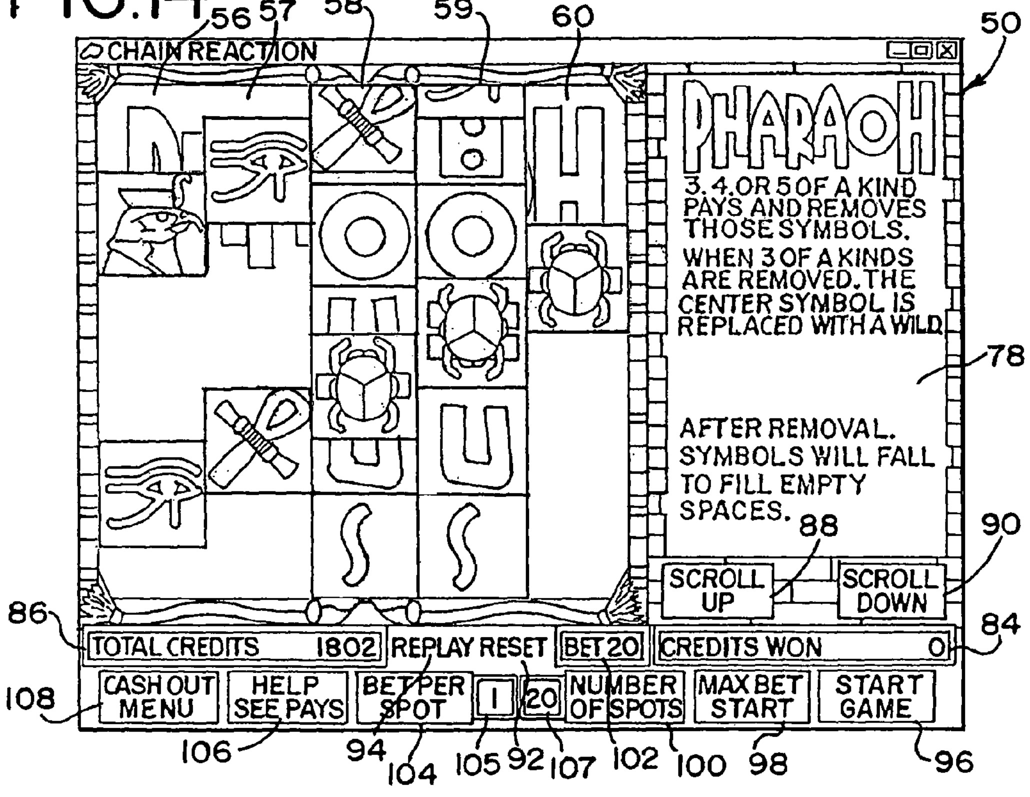
FIGS. 14 and 15 are various video displays showing another variation of the FIGS. 8 through 13 of the invention.

FIG. 14 shows a game in the middle of the "deal". At the beginning of the deal the program makes a random selection to determine if any column should be a bonus round initiation column. In this game, the third and fourth column 58, 59 were selected as possible bonus round initiators. This game requires all of the twenty-five symbols to be selected, for the possibility of a bonus round, which then fall into place, totally obscuring the selected columns. Other embodiments allow bonus rounds for any number of symbols played.

Figure 15:
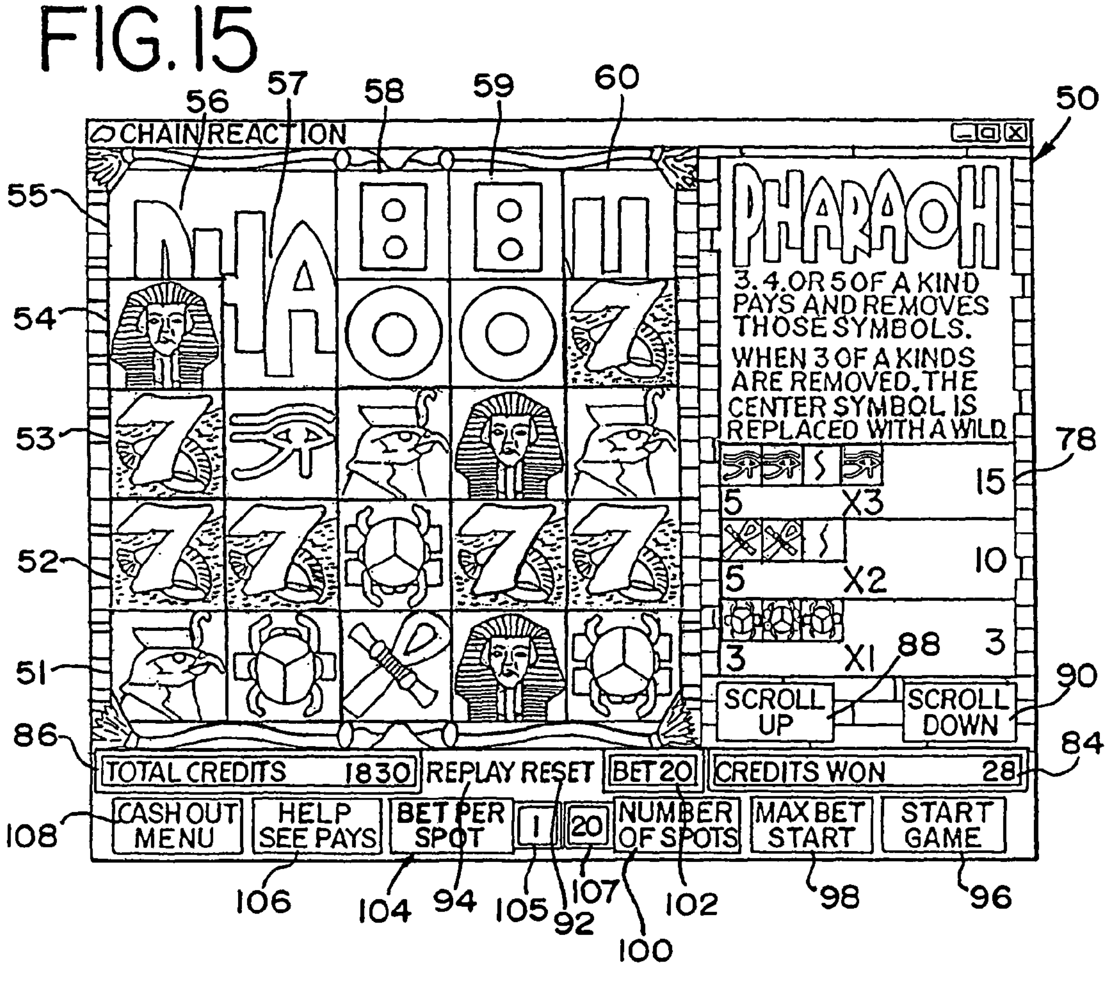

FIG. 15 is this same game display at completion of the game, showing the partial revealing of the "B-O-N-U-S" in the third and fourth columns 58, 59. If one or more of the Bonus Columns were completely cleared out, then a bonus game would run at the conclusion of this game. This method of randomly selecting available columns has an advantage, in that it allows the frequency of bonus round initiations to be very finely tuned. By combining this with the geometric configuration (rather than using the geometric configuration on its own), the bonus game may be set at any desired frequency. If just the geometric frequency was used to initiate a bonus game, it becomes more difficult to fine tune the initiating event. While there is an interesting anticipation in the player that results from uncovering the B-O-N-U-S letters behind the tiles in this version, the specific geometric pattern may be otherwise indicated without departing from the invention.

In the game of FIGS. 8-13, the second column 57 was completely cleared out. If that game incorporated the bonus round and column 57 had been designated a bonus round initiating column, then the bonus round would have initiated at the end of the normal play. Any desired bonus game can be used, if desired, as is well known by those skilled in the art.

Additional Bonuses

Other bonuses may be awarded based on the results of the game, including certain bonuses for achieving geometric feats. In this preferred embodiment there is a large bonus for clearing all twenty-five symbols off the board (leaving no symbols on the board at the end of the game). There could be bonuses for other geometric arrangements, such as clearing three or four columns or clearing the three or four top rows.

Operational Flowcharts

Figure 16:
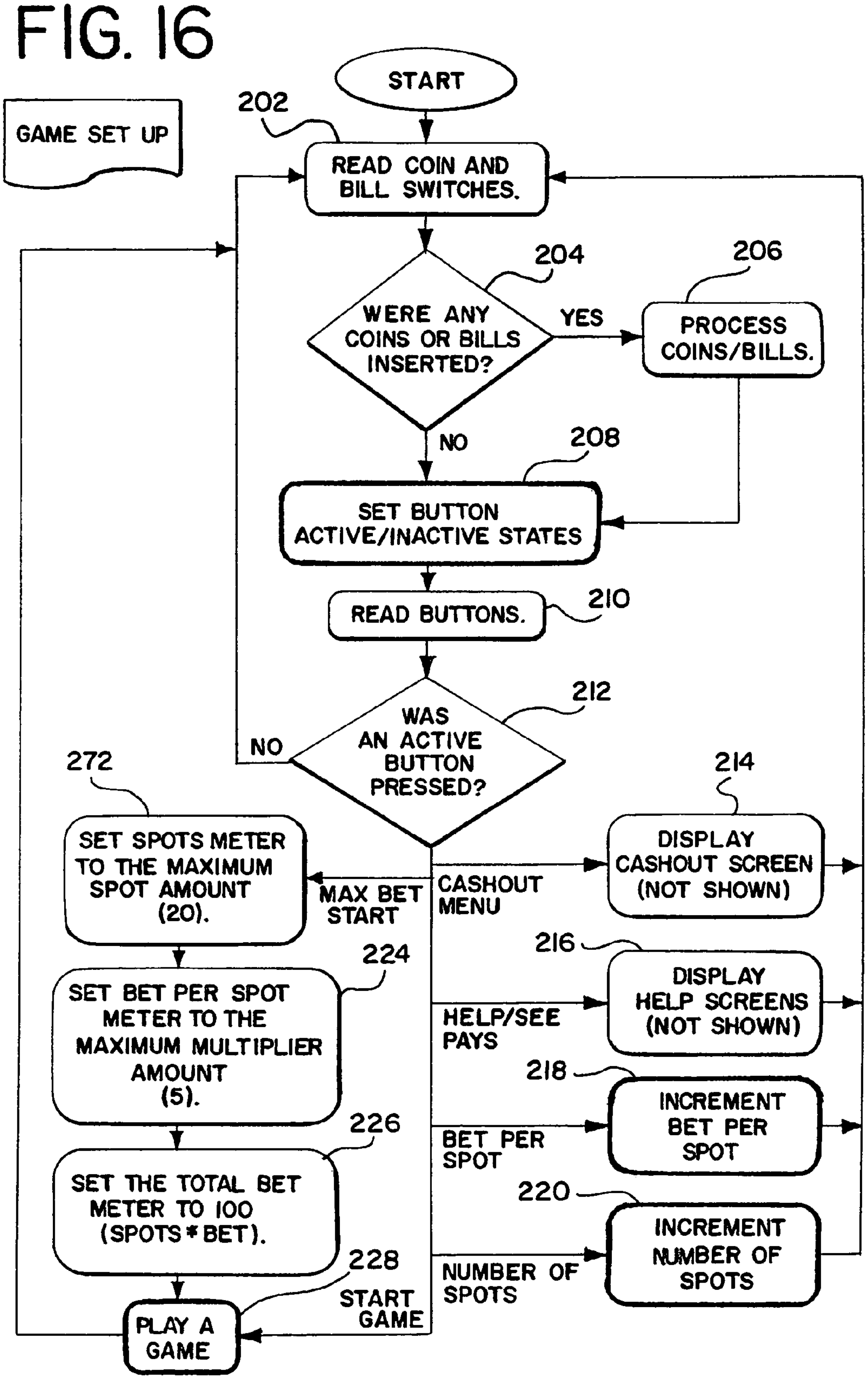
FIG. 16 through 27 are diagrammatic flowcharts of an embodiment of a game program made in accordance with the present invention.

The programming for certain embodiments described above is operationally summarized in the flowcharts of FIGS. 16 through 27. FIG. 16 generally describes a Game Set Up program of the "Chain Reaction" game program. First in step 202, the program proceeds to read one or more switches that register if any coins, dollar bills, credit cards, etc. were inserted in the gaming machine. At step 204, a check is made as to whether the player has inserted any coins, dollar bills, credit cards, etc. If so, then at step 206, the coins, bills, or credit cards are processed, registered, and displayed on the "Total Credits" meter 86 (e.g., FIG. 6). In step 208, the program proceeds to complete a "Set Button Active/Inactive States" subroutine, described hereinafter, to activate any buttons of the gaming machine needed for initiation of play. In one embodiment, the buttons that are activated include the "Cashout Menu" button 108, the "Help See Pays" button 106, the "Bet Per Spot" button 104, the "Number of Spots" button 100, the "Max Bet Start" button 98, and the "Start Game" button 96 (e.g., FIG. 2). Referring back to step 204, if the player had not entered any coins, dollar bills, credit cards, etc. into the gaming machine, the program would have proceeded directly to step 208.

After the program returns from the "Set Button Active/Inactive States" subroutine, the program reads any active buttons of the gaming machine in step 210. In step 212, a determination is made of whether the player actuated any active buttons. If the player did not actuate any of the active buttons, the program returns to complete step 202 again. If the player did actuate one of the active buttons, the program proceeds to execute any step associated with the particular actuated button.

If the player actuates the "Cashout Menu" button 108 (e.g. FIG. 6), the program displays a Cashout Menu Screen (not shown) at step 214. After the program returns from the Cashout Menu Screen, the program returns to complete step 202.

If the player actuates the "Help See Pays" button 106 (e.g. FIG. 6), the program displays any Help and Paytable Screens (not shown) at step 216. After the program returns from the Help and Paytable Screens, the program returns to complete step 202.

If the player actuates the "Bet Per Spot" button 104, the program calls an "Increment Bet Per Spot" subroutine, described hereinafter, at step 218. After the program returned from the "Increment Bet Per Spot" subroutine, the program returns to complete step 202.

If the player actuates the "Number of Spots" button 100, the program proceeds to complete an "Increment Number of Spots" subroutine, described hereinafter, at step 220. After the program returns from the "Increment Number of Spots" subroutine, the program returns to complete step 202.

If the player actuates the "Max Bet Start" button 98, the program sets the "Number of Spots" 107 meter to 20 at step 222. The program then sets the "Bet Per Spot" meter 105 to 5 in step 224. Next in step 226, the program sets the "Bet" meter 102 to one hundred. After step 226 is completed, the program proceeds to complete a "Play A Game" subroutine, described hereinafter, in step 228. Alternatively, if the player actuates the "Start Game" button 96, the program directly executes the "Play A Game" subroutine, described hereinafter, in step 228. In either case, the program returns to step 202 after the game is complete.

Figure 17:
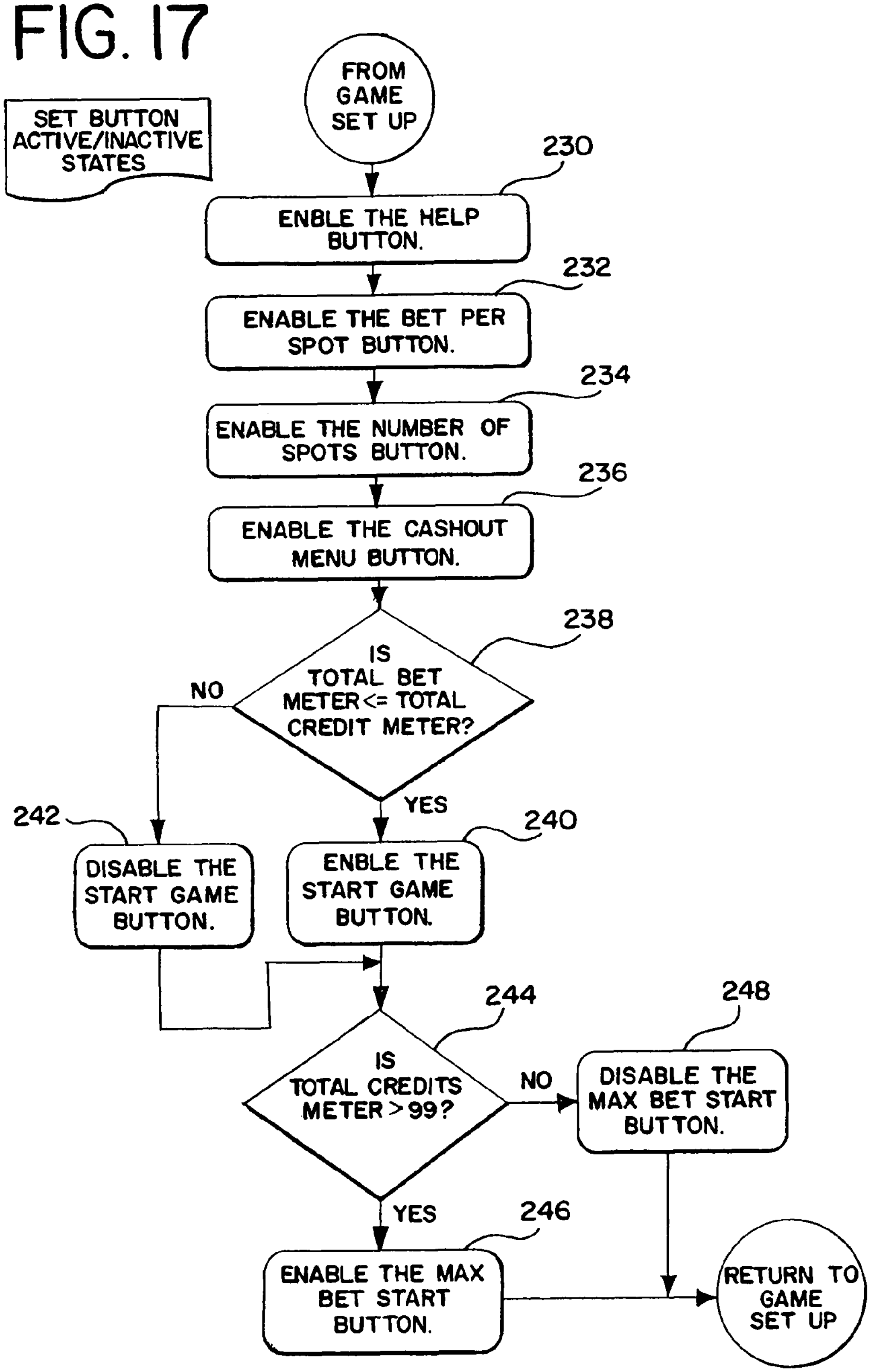

FIG. 17 depicts the steps of the "Set Button Active/Inactive States" subroutine of step 208 of FIG. 16. In step 230 of this subroutine, the program enables the "Help See Pays" button 106 on the gaming machine. In step 232, the "Bet Per Spot" button 104 is enabled. Next, the program enables the "Number of Spots" button 100 in step 234 and the "Cashout Menu" button 108 in step 236. In step 238, the program determines if the value of the "Bet" meter 102 is less than or equal to the value of the "Total Credits" meter 86. If so, then the "Start Game" button 96 is enabled in step 240. If the value of the "Bet" meter 102 is not less than or equal to the value of the "Total Credits" meter 86, then the "Start Game" button 96 is disabled in step 242. After completion of either step 240 or 242, the program determines if the value of the "Total Credits" meter 86 is greater than ninety-nine at step 244. If so then the "Max Bet Start" button 98 is enabled in step 246. If the value of the "Total Credits" meter 86 is not greater than ninety-nine, then the "Max Bet Start" button 98 is disabled in step 248. After completion of either step 246 or 248, the program returns to execute step 210 in the Game Set Up Routine (see FIG. 16).

Figure 18:
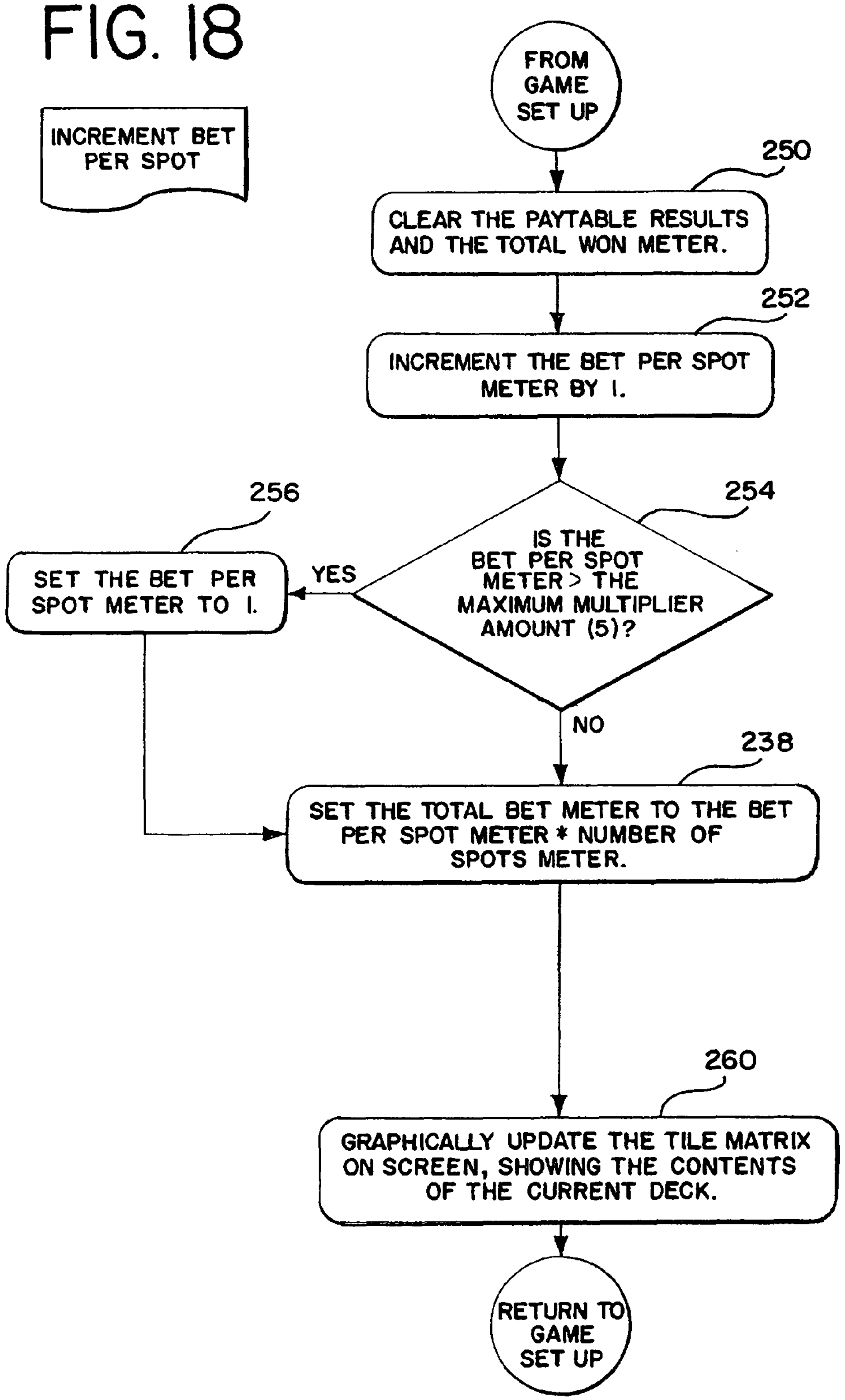

FIG. 18 depicts the steps of the "Increment Bet Per Spot" subroutine of step 218 of FIG. 16. In step 250 of this subroutine, the program clears the paytable results and the value of the "Credits Won" meter 84. In step 252, the program increments the value of the "Bet Per Spot" meter 105 by one. The program then determines if the value of the "Bet Per Spot" meter 105 is greater than a preset maximum (i.e. five) in step 254. If the value of the "Bet Per Spot" meter 105 is greater than a preset maximum (i.e. five), then the value of the "Bet Per Spot" meter 105 is set to one in step 256. In step 258, the program sets the value of the "Bet" meter 102 to the product of the value of the "Bet Per Spot" meter 105 and the value of the "Number Per Spots" meter 107. Referring back to step 254, if the value of the "Bet Per Spot" meter 105 was not greater than the preset maximum (i.e. five), the program would have proceeded directly to step 258. After step 258 is completed, the program graphically updates the tile or card matrix on the screen or display to show the contents of the current deck in step 260. After step 260 is completed, the program returns to the Game Set Up Routine (see FIG. 16) ready to execute step 202.

Figure 19:
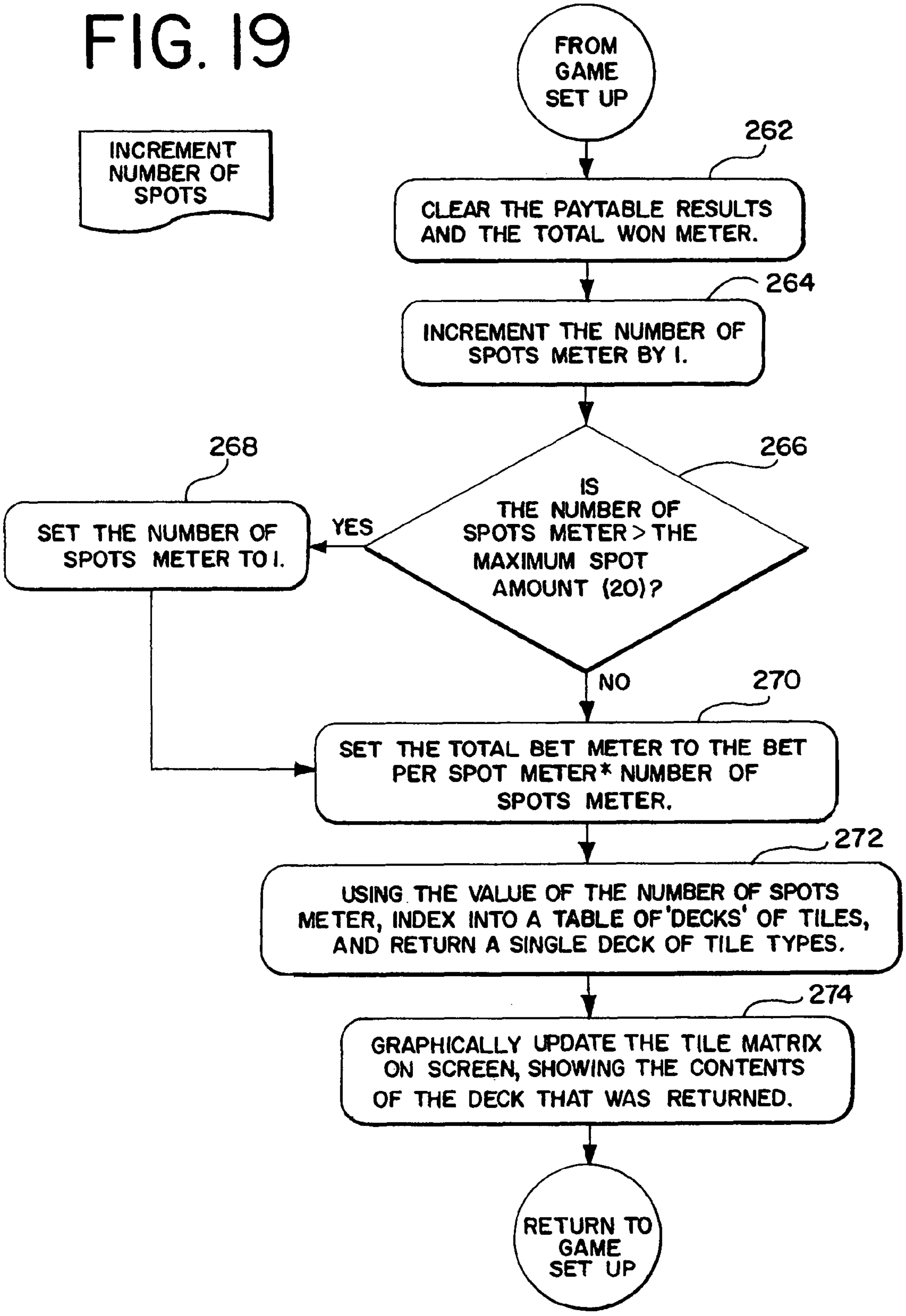

FIG. 19 depicts the steps of the "Increment Number of Spots" subroutine of step 220 of FIG. 16. In step 262 of this subroutine, the program clears the paytable results and the value of the "Credits Won" meter 84. In step 264, the program increments the value of the "Number of Spots" meter 107 by one. The program then determines if the value of the "Number of Spots" meter 107 is greater than a maximum spot amount (i.e. twenty) in step 266. If the value of the "Number of Spots" meter 107 is greater than a preset maximum (i.e. twenty), then the value of the "Number of Spots" meter 107 is set to one in step 268. Then in step 270, the program the sets the value of the "Bet" meter 102 to the product of the value of the "Bet Per Spot" meter 105 and the value of the "Number Of Spots" meter 107. Referring back to step 266, if the value of the "Number of Spots" meter 107 was not greater than the maximum spot amount (i.e. twenty), the program would have proceeded directly to step 270. In step 272, the program uses the new value of the "Number of Spots" meter 107 to index in a table of decks of tiles for a single deck of tile types for gameplay. In step 274, the program graphically updates the tile or card matrix on the screen to show the contents of the newly selected gameplay deck. After step 274 is completed, the program returns to the Game Set Up Routine (see FIG. 16) ready to execute step 202.

Figure 20:
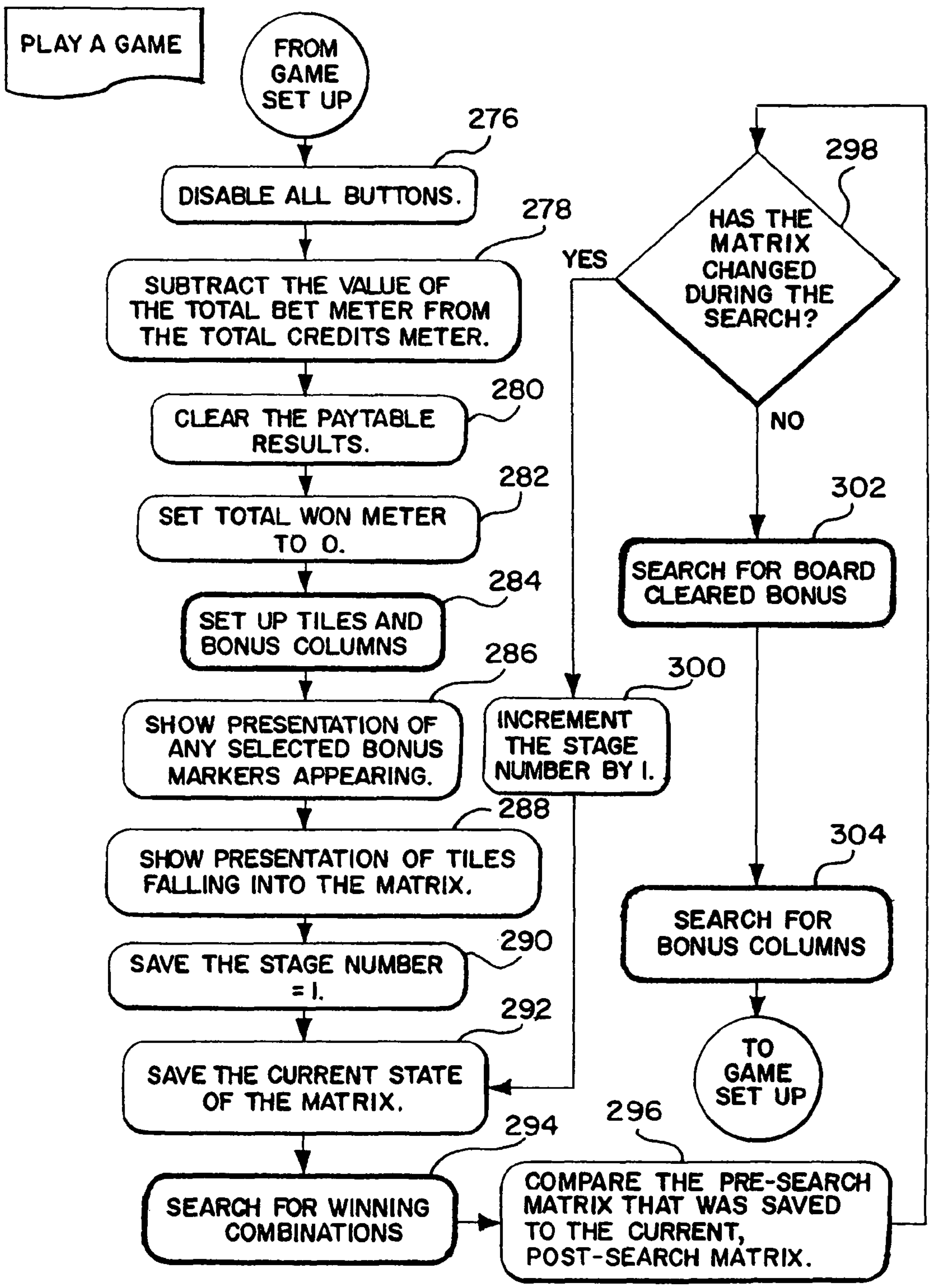

FIG. 20 depicts the steps of the "Play A Game" subroutine of step 228 of FIG. 16. In step 276 of this subroutine, the program disables all active buttons. Then in step 278, the value of the "Bet" meter 102 is subtracted from the value of the "Total Credits" meter 86 and the result is displayed in the "Total Credits" meter 86. The paytable results from the previous game are cleared from the Information Area 78 in step 280. In step 282, the value of the "Credits Won" meter 84 is set to zero. In step 284, the program calls a "Set Up Tiles and Bonus Columns" subroutine, described hereinafter, to determine the random locations of the tiles and Bonus Columns, if any. After returning from the "Set Up Tiles and Bonus Columns" subroutine, the program displays the Bonus Column markers, if any, in step 286. In step 288, the game display shows the presentation of the tiles falling into the previously determined tile locations. The stage number is then set to a value of one in step 290. The program then saves a copy of the current matrix of tiles in step 292. In step 294, the program calls a "Search For Winning Combinations" subroutine, described hereinafter, to determine if any winning combinations exist in the current matrix of tiles. This routine also handles the removal, substitution and transformation as will be seen. After the program returns from the "Search For Winning Combinations" subroutine, the saved pre-search matrix of tiles is compared to post-search matrix of tiles in step 296. In step 298, the program determines if the matrix of tiles was changed by the "Search For Winning Combinations" subroutine. If the matrix of tiles did change during the "Search For Winning Combinations" subroutine, then the program increments the value of the stage number by one in step 300. After step 300 is completed, the program proceeds to execute step 292 to proceed to the next stage evaluation and continues on normally as previously described.

Referring back to step 298, if the matrix of tiles did not change during the "Search For Winning Combinations" subroutine, the program proceeds to step 302 and calls a "Search For Board Cleared Bonus" subroutine, described hereinafter, to determine if a board cleared bonus can be awarded. After the program returns from the "Search For Board Cleared Bonus" subroutine, the program proceeds to step 304 and calls a "Search for Bonus Columns" subroutine, described hereinafter, to determine if a Bonus Round or Game can be awarded. Once the program returns from the "Search for Bonus Columns" subroutine, the program returns to the Game Set Up Routine ready to execute step 202 (see FIG. 16).

Figure 21:
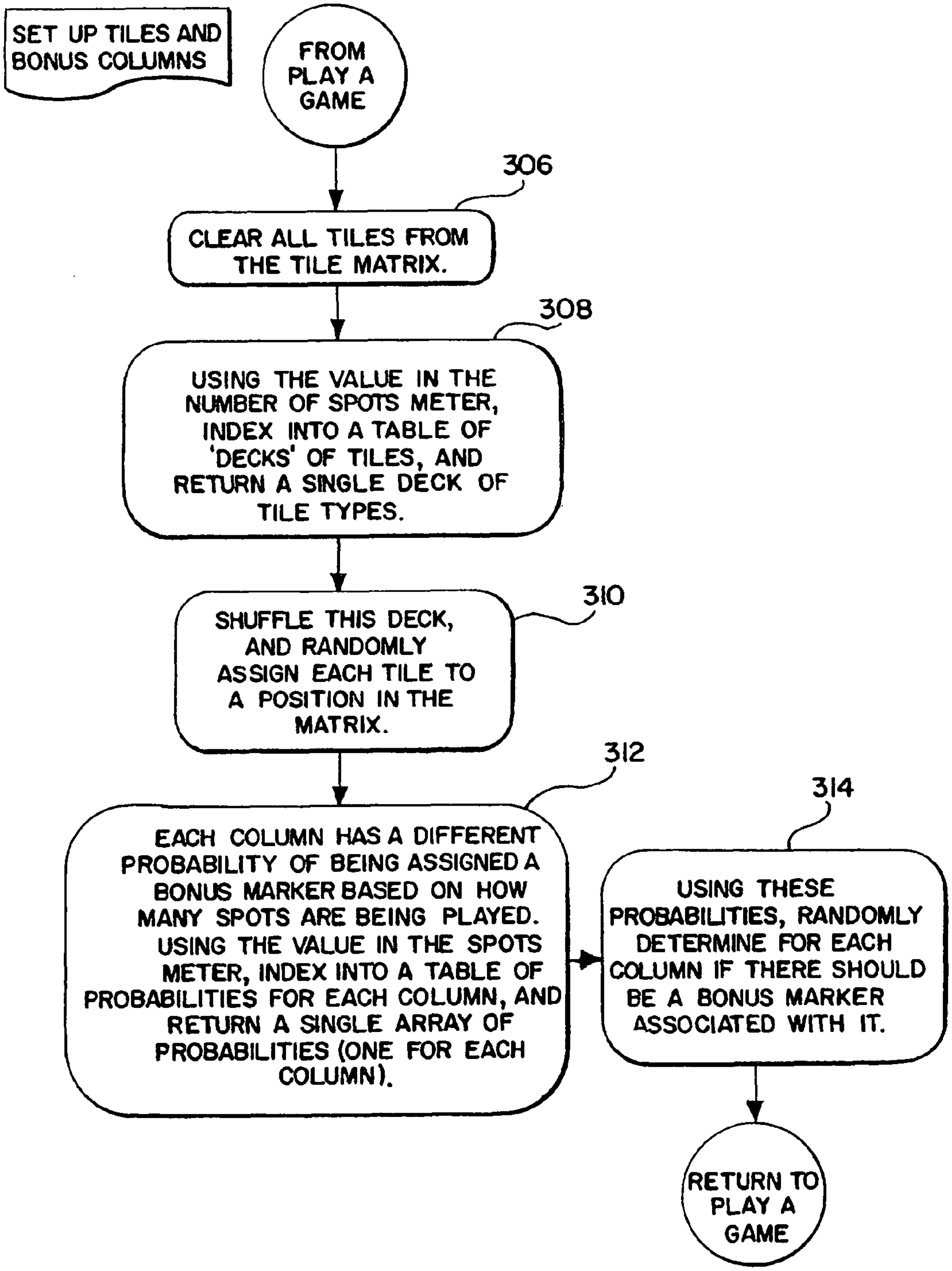

FIG. 21 depicts the steps of the "Set Up Tiles And Bonus Columns" subroutine of step 284 of FIG. 20. In step 306, the program clears all tiles from the matrix. In step 308, the program obtains the appropriate deck of tiles as previously determined in step 272 of FIG. 19. In step 310, the deck of tiles are "shuffled" and assigned to an initial position in the matrix. In step 312, the program indexes into a table to obtain an array of probabilities for the possibility of each column becoming a Bonus Column based upon the value of the "Number of Spots" meter 107 (see FIG. 6). This is required because each column has a different probability of becoming a Bonus Column based upon how many spots are being played. Based on the array of probabilities, the program then randomly determines if any of the columns should be designated as a Bonus Column in step 314. This is done using the "RNG" as is well known in the art. Once step 314 has been completed, the program will return to complete step 286 of FIG. 20.

Figure 22:
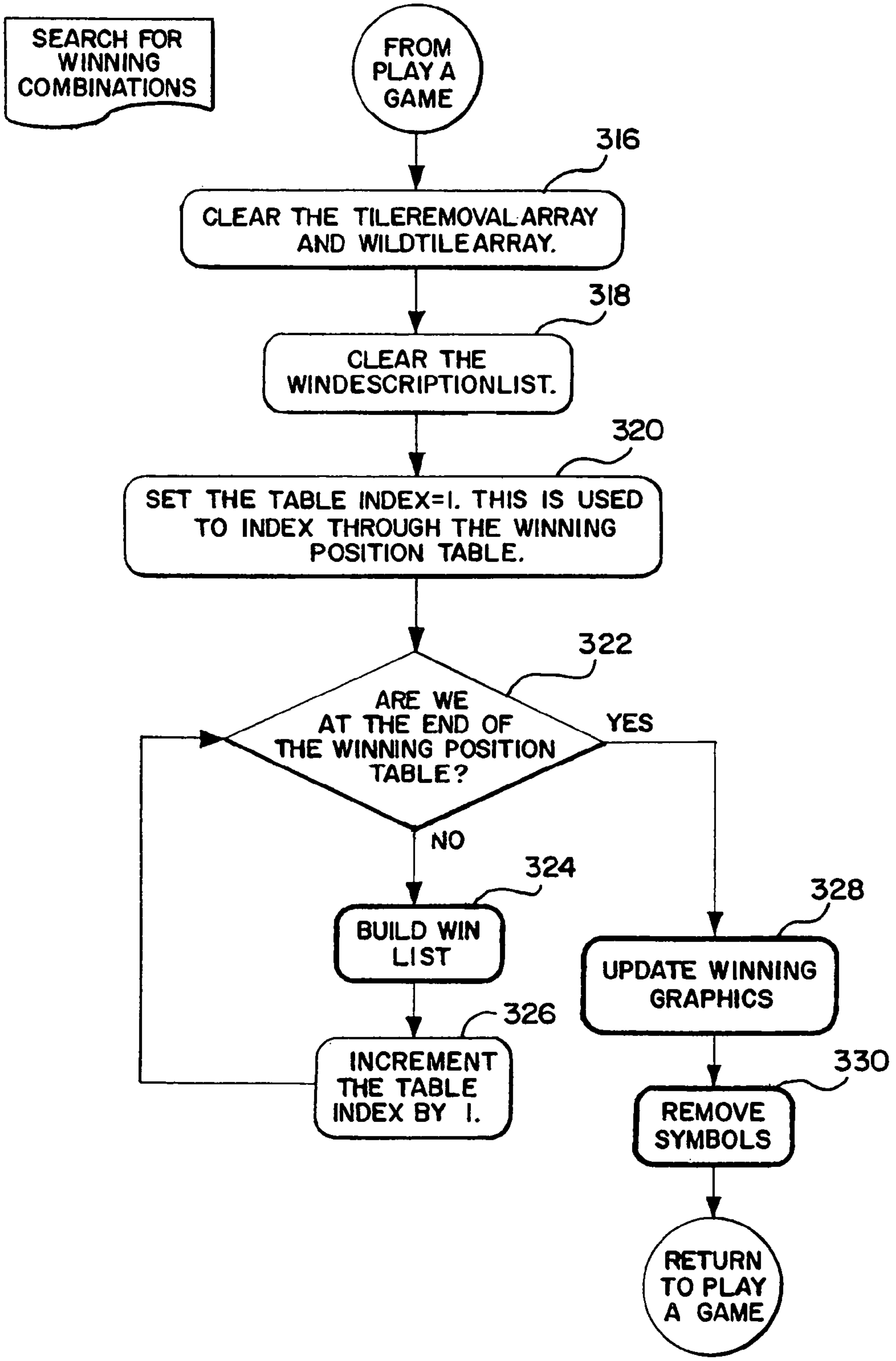

FIG. 22 depicts the steps of the "Search For Winning Combinations" subroutine of step 294 of FIG. 20. In step 316, the program clears the Tile Remove Array and the Wild Tile Array. In step 318, a Win Description List is cleared. A Table Index is set to one in step 320. The Table Index is used to index through all possible winning locations (i.e. ten possible position locations for five of a kind, twenty possible position locations for four of a kind, and thirty possible position locations for three of a kind). In step 322, the program determines if all possible winning locations have been examined. If not, then the program continues to step 324 and calls a "Build Win List" subroutine, described hereinafter. After the program has returned from the "Build Win List" subroutine, the Table Index is incremented by a value of one in step 326. After step 326 is completed, the program returns to execute step 322 again and continues on as described herein. Referring back to step 322, if the program has determined that all possible winning locations have been examined, then the program calls an "Update Winning Graphics" subroutine, described hereinafter, in step 328. After the program returns from the "Update Winning Graphics" subroutine of step 328, the program calls a "Remove Symbols" subroutine, described hereinafter, in step 330. This "Remove Symbols" subroutine handles any removal, substitution and transformation. After the program returns from "Remove Symbols" subroutine, the program returns to the "Play A Game" subroutine to complete step 296 (see FIG. 20).

Figure 23:
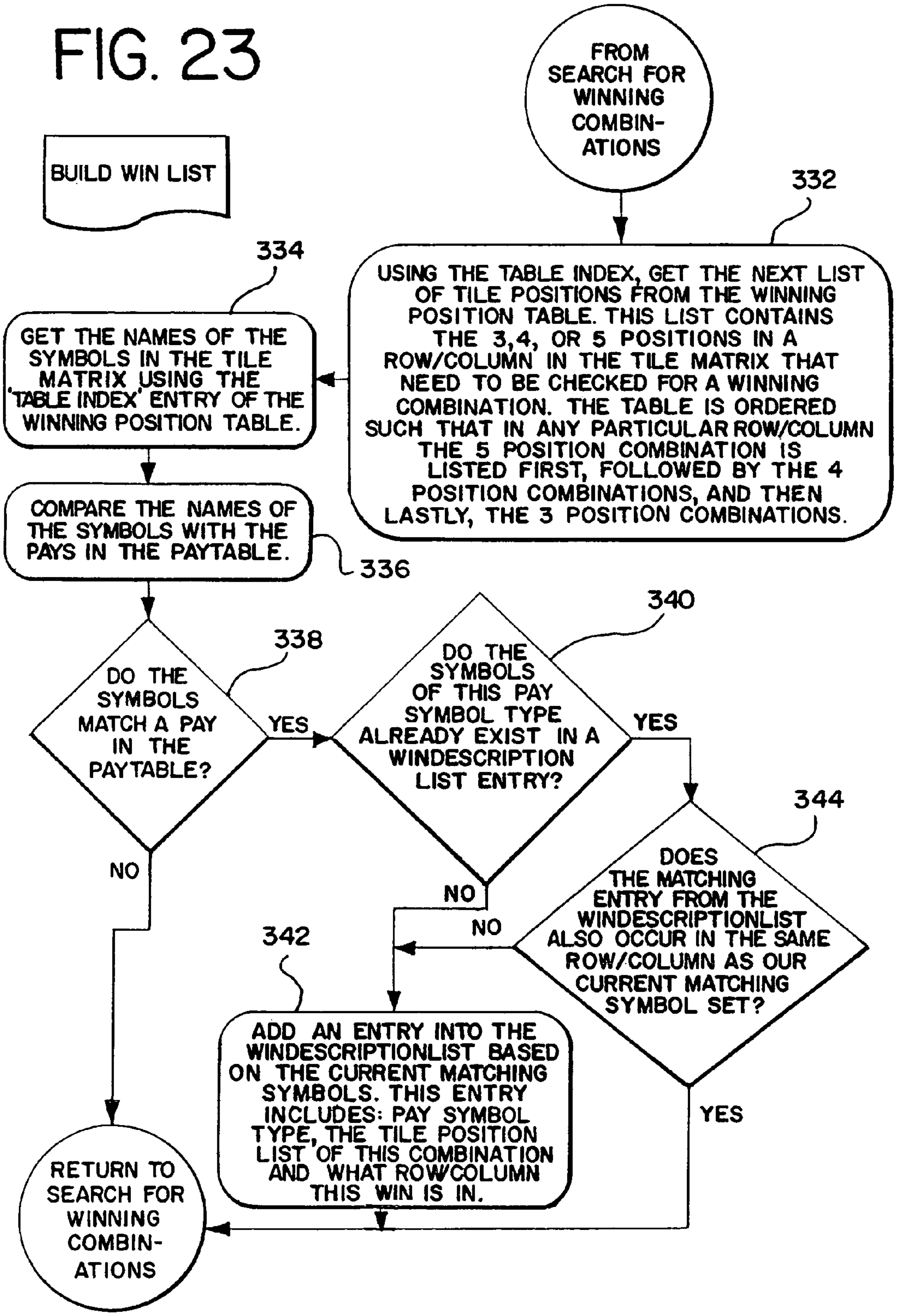

FIG. 23 depicts the steps of the "Build Win List" subroutine of step 324 of FIG. 22. In step 332, the program uses the Table Index to review each possible winning position within the matrix. This step fetches the positions in the matrix to be checked for the current table index. It important to note that the ten possible positions for five of a kind are reviewed first, followed by a review of the twenty possible positions for four of a kind, and ending with a review of the thirty possible positions for three of a kind. The importance of this order will be expanded upon shortly. After step 332 has been completed, in step 334, the program obtains the names of the tile matrix symbols for the matrix positions fetched in step 332. Next in step 336, the program compares the names of the symbols in the selected positions to the symbol combinations of the Paytable. In step 338, the program determines if the symbol names match a symbol combination in the Paytable.

If so, then in step 340, the program determines if this symbol type matches any existing entries in the Win Description List. If symbol types do match any existing entries in the Win Description List, then step 344 is executed and the program determines if the matching entry from the Win Description List also occurs in the same row or column as the current matching symbol set. If the matching entry from the Win Description List also occurs in the same row or column as the current matching symbol set, then the win is not added to Win Description List and the program returns to step 326 of FIG. 22. If the matching entry from the Win Description List does not also occur in the same row or column as the current matching symbol set, a win position has been encountered. In step 342, an entry is added into the Win Description List which includes the Pay Symbol Type, the tile position list and what row or column the win occurred in. After step 342 is completed, the program returns to the "Search For Winning Combinations" subroutine ready to execute step 326.

As alluded to above, the steps of 332, 340, and 344 ensure that a player gets paid only for the highest matched set of symbols. For illustration purposes imagine that a deal resulted in row containing "Blue 7", "Blue 7", "Blue 7", "Red 7", and "Red 7". The player would be paid for five "Any 7's" and three "Blue 7's". The player would not receive an award for the other two embedded three "Any 7's" and the two embedded four "Any 7's".

Referring back to step 340, if the symbol type did not match any existing entries in the Win Description List, the program would have executed step 342 and continued on from there.

Referring back to step 338, if the symbol names did not match a payline in the paytable, then the program would have returned to the "Search For Winning Combinations" subroutine ready to execute step 326.

Figure 24:
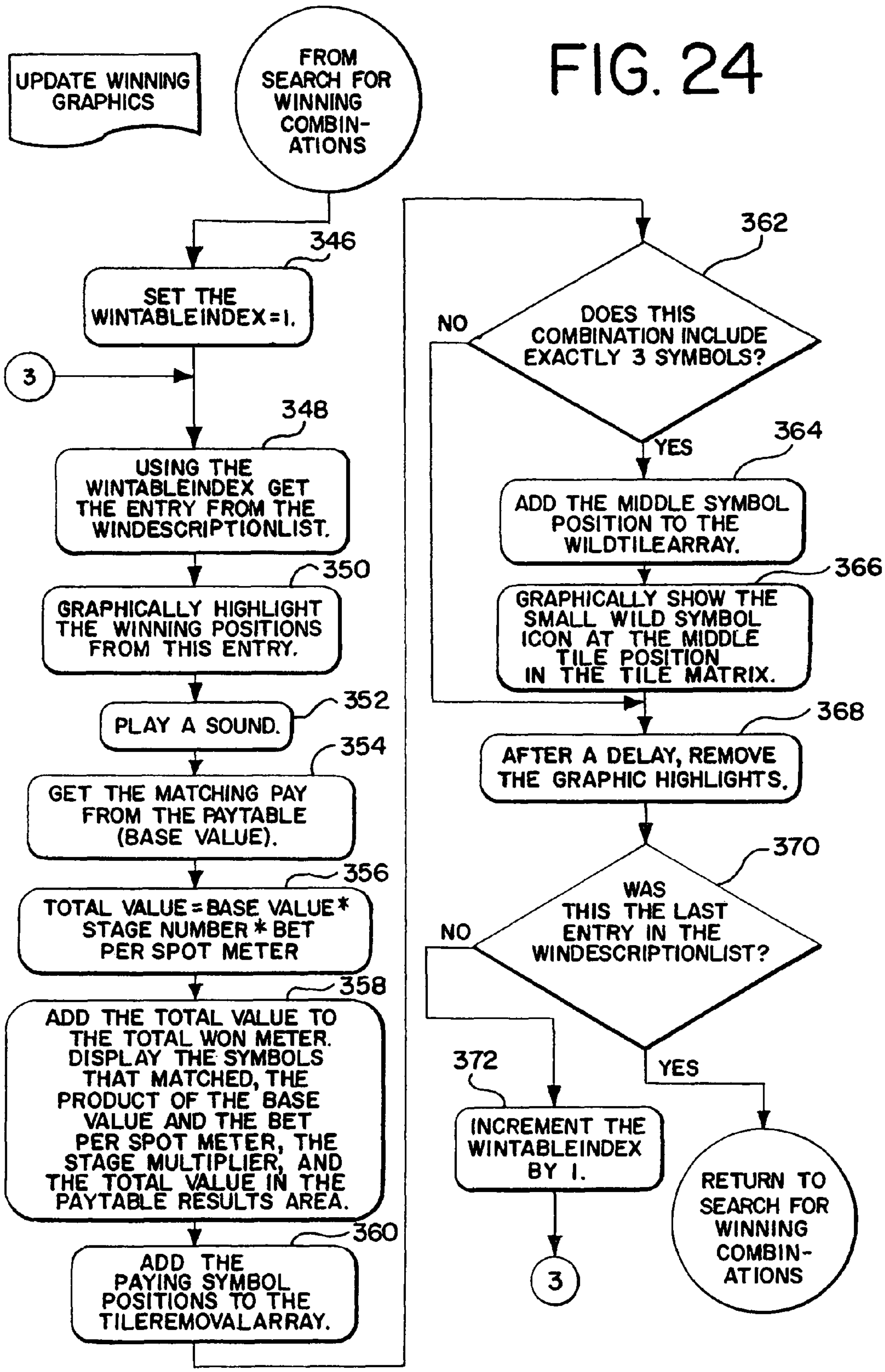

FIG. 24 depicts the steps of the "Update Winning Graphics" subroutine of step 328 of FIG. 22. In step 346, the program sets a Win Table Index to one. Then in step 348, the entry from the Win Description List is obtained using the Win Table Index. The program then graphically highlights the winning positions from the entry in step 350 and a sound is played in step 352. In step 354, the pay value is obtained from the paytable. The program then sets Total Value equal to the product of the base value, the stage number, and the value of the "Bet Per Spot" meter 105 in step 356. In step 358, the Total Value is added to the "Credits Won" meter. In step 358, the matching symbols, the total value, the stage multiplier, the product of the base value and the value of the "Bet Per Spot" meter are all displayed in the paytable in the Information Results Area 78. The paying symbol positions are then added to the Tile Removal Array in step 360. The program makes a determination in step 362 as to whether the paying symbol positions include exactly three symbols. If so, then the center position of the three symbol positions is added to the "Wild" Tile Array in step 364. In step 366, the program graphically indicates a small "Wild" symbol icon in the center position of the three symbol positions. The "Wild" symbol icon is located and sized nearly the same as the bet indicator 80 of FIG. 2 with a "W" replacing the "1". In step 368, the graphic highlights are removed after a short delay.

Referring back to step 362, if the program determined that the paying symbol positions did not include exactly three symbols, then the program would have proceeded to execute step 368 to remove the graphic highlights after a short delay. After step 368 is executed, the program determines if this is the last entry in the Win Description List in step 370. If this is not the last entry in the Win Description List, then the program will increment the Win Table Index by one in step 372. After completion of step 372, the program will loop back to execute step 348 and will continue on as previously described.

Referring back to step 370, if this is the last entry in the Win Description List, then the program will return to "Searching For Winning Combinations" subroutine (FIG. 22) to execute step 330.

Figure 25:
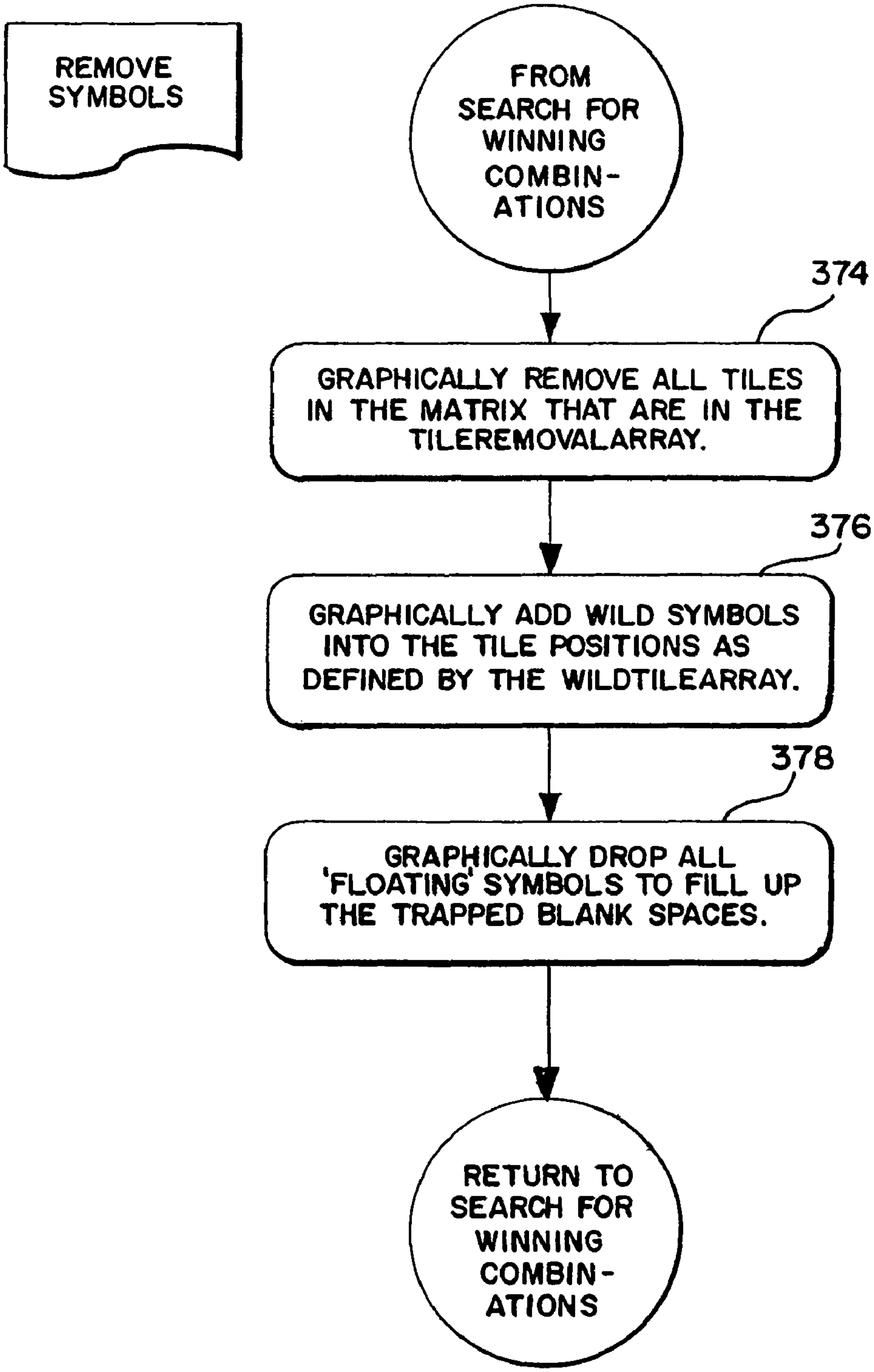

FIG. 25 depicts the steps of the "Remove Symbols" subroutine of step 330 of FIG. 22. In step 374, the program graphically removes all tiles in the matrix that are identified in the Tile Removal Array. In step 376, the program graphically adds "Wild" symbols into the tile positions that are identified in the "Wild" Tile Array. In step 378, the program graphically drops all 'floating' symbols directly downward to fill up all trapped blank or empty spaces. After step 378 is completed, the program returns through the "Search For Winning Combinations" (FIG. 22) subroutine and futher returns to "Play A Game" subroutine ready to execute step 296 (FIG. 20).

Figure 26:
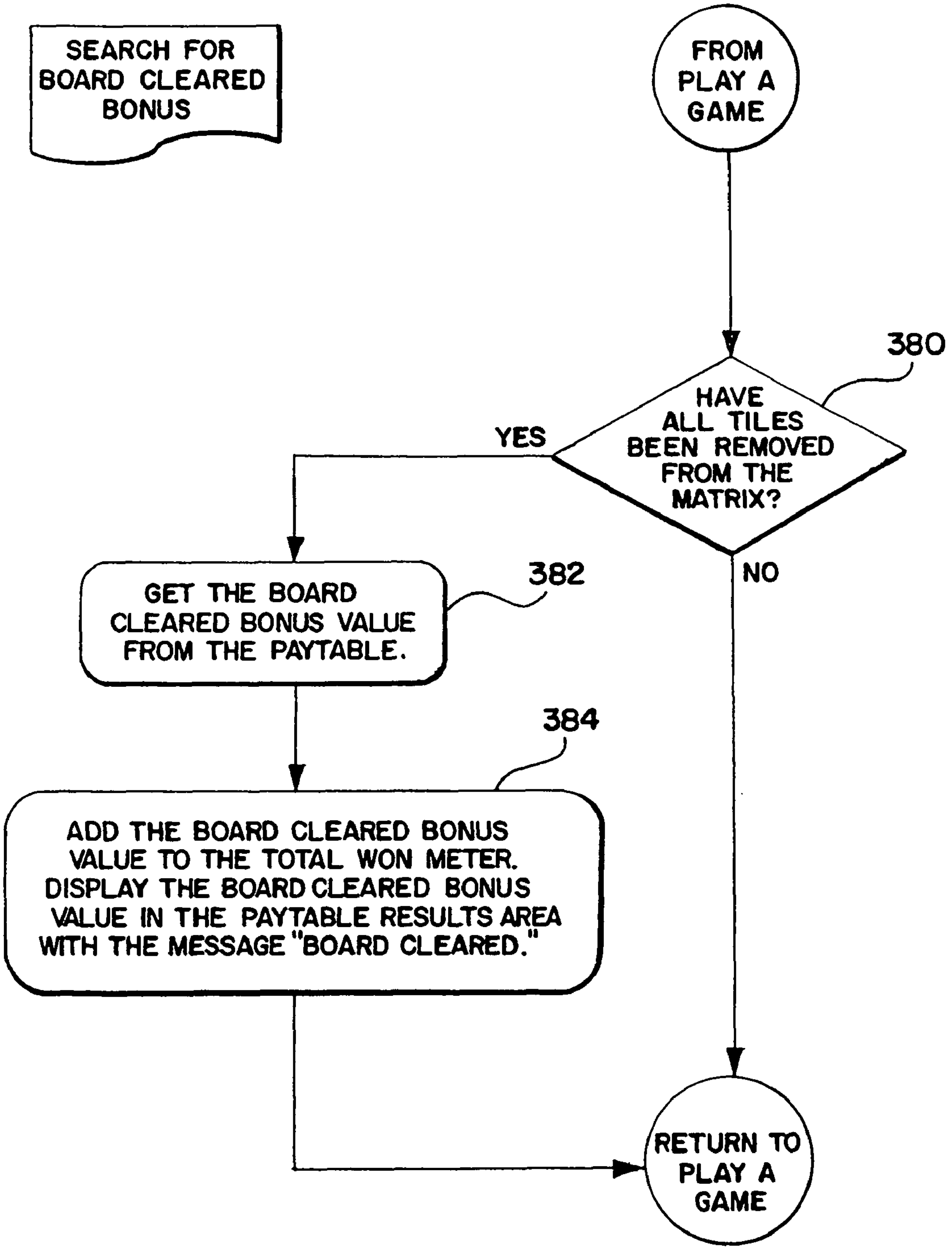

FIG. 26 depicts the steps of the "Search For Board Cleared Bonus" subroutine of step 302 of FIG. 20. In step 380, the program determines if all tiles have been cleared from the matrix. If so, a "Board Cleared Bonus" value is obtained from the paytable in step 382. The program then adds the value of the "Board Cleared Bonus" value to the "Credits Won" meter 84 in step 384. Step 384 also includes displaying a Board Cleared Bonus value in the paytable in the Information Area 78 (see FIG. 6). The program returns back to the "Play A Game" subroutine (FIG. 20) ready to execute step 304 after completing either step 384 or step 380 when the program determines that not all tiles have been cleared from the matrix.

Figure 27:
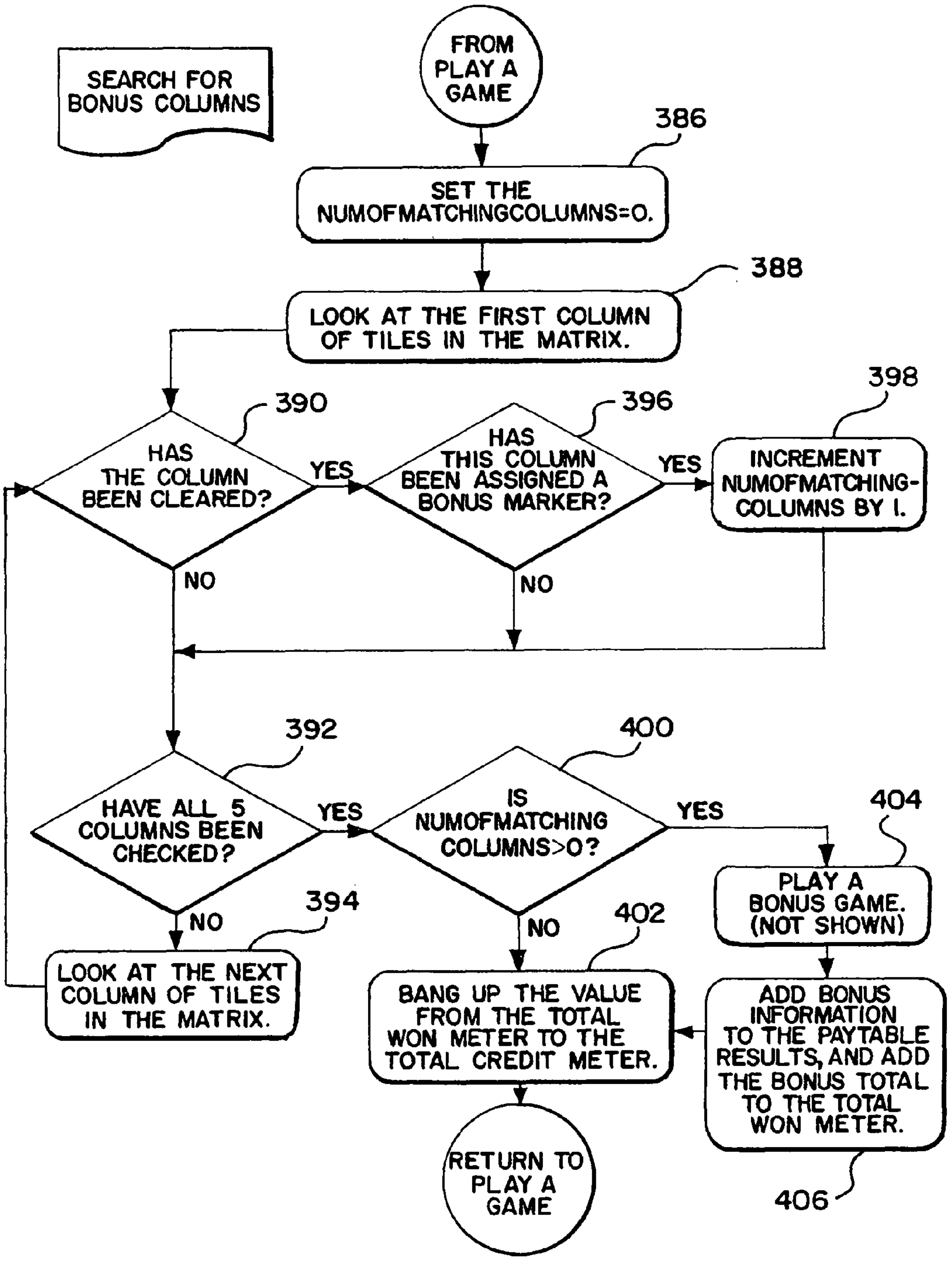

FIG. 27 depicts the steps of the "Search For Bonus Columns" subroutine of step 304 of FIG. 20. First, in step 386, the program sets the "Num Of Matching Columns" value to zero. In step 388, the program examines the first column of tiles in the matrix. The program determines if this column has been cleared in step 390. If the column has not been cleared, then the program executes step 392 and determines if all five column have been examined. If not, then the program examines the next column of tiles in the matrix in step 394. After step 394 is completed, the program loops back to complete step 390 again.

Referring back to step 390, if the program determines that this column has been cleared, then the program proceeds to step 396 and determines if the column has been assigned a Bonus Marker. If the column has not been assigned a Bonus Marker, then the program proceeds to execute step 392 described above and continues on from there. If however, it is determined that the column has been assigned a Bonus Marker in step 396, then the program increments the "Num Of Matching Columns" value by one in step 398. After step 398 is completed, the program proceeds to execute step 392 described above and continues on from there.

Referring back to step 392, if it is determined that all five columns have been examined, then the program executes step 400 to determine if the "Num Of Matching Columns" value is greater than zero. If the "Num Of Matching Columns" value is not greater than zero, the program "bangs up" the value of the "Credits Won" meter 84 into the "Total Credits" meter 86 in step 402.

Referring back to step 400, if the "Num Of Matching Columns" value is greater than zero, then the program executes a Bonus Game (not shown) in step 404. Once the program has returned from the Bonus Game, the program adds the bonus information to the paytable in the Information Area 78 and adds the number of credits earned in the bonus round to the "Credits Won" meter 84 in step 406. After step 406 is completed, the program executes step 402 as described above. After step 402 is completed, the program returns through the Play A Game" subroutine (FIG. 20) and returns further to the "Game Set Up" routine (FIG. 16) to execute step 202 to play a new round.

Analysis of the Game

In a preferred embodiment of the game, a separate analysis is performed for each number of tiles (blocks, symbols, game elements) played (one to twenty credits playing six to twenty-five tiles respectively). Each such analysis will confirm the return for the selected paytable. In the preferred embodiment, the pay values for each combination will remain constant and different symbol sets will be used for different number of tiles. The game could instead use one set of symbols when twenty-five tiles are played, and then use only subsets of this set for playing fewer tiles. Or, as previously stated, the same symbols could be used for all wagers with wins only awarded in squares that were wagered upon. The methodology used for changing the bet is not important, and there are many schemes that will work within the scope of the invention. The analysis shown below is for playing the twenty-five symbol "deck" or set with a wager of twenty credits.

To perform a conventional mathematical analysis on this game, it is necessary to understand the results of every possible hand. In the illustrated embodiment above, which randomly distributed a set of twenty-five tiles to the twenty-five positions, there are a possible twenty-five factorial starting combinations, thus resulting in over 15.5 septillion games to analyze:

$$25!=15{,}511{,}210{,}043{,}330{,}985{,}984{,}000{,}000$$

Schemes using a larger set of tiles or using a random selection at each tile position would result in an even larger space of possible games.

Using conventional mathematical analysis to analyze the game, one would write a computer program to analyze each distinct possible placement. If possible, redundancies could be removed to trim down the number of boards which needed to be analyzed. Given the current speed of computers and the massive number of combinations, it was decided that it would take too long for current computers to complete such a detailed analysis, even with a massive reduction of redundant boards. Happily, through random simulation of the game, the results can be seen to converge at much lower play counts.

A program was written to play the game using the twenty-five tile set shown in FIG. 2. For each game, the tiles are placed randomly using an "RNG", as is well known in the art. Then, for each board placement, the program proceeds to evaluate winners, remove wining tiles, substitute wild symbols for the center of three symbol combinations, and then compact downwardly. The evaluation is then repeated until there are no winning combinations found. The program includes a counter for each possible pay (e.g. three Tuts, four Ankhs, five "Red 7's" etc.) for each possible evaluation level.

In the running of these simulations, there were never any winning combinations past the twelfth evaluation. Any time that there are one or more winning combinations, play results in the removal of at least two symbols. After twelve evaluations, under the rules of this embodiment, there must be at least twenty-four symbols removed. This means that after twelve winning evaluations there will be exactly zero or one symbol left on the board, which cannot result in a thirteenth level winner. Using a different methodology of tile removal could result in more possible evaluations. Those skilled in the art understand how to expand the occurrence tables to cover all possible outcomes.

For the analysis shown here, a simulation of five billion games was played, recording each pay at each evaluation level. Those skilled in the art understand how to determine an adequate number of games to play such that the results are convergent. Table 2 shows the number of occurrences of each possible pay at each evaluation level.

Looking at the "3 King Tut" combination, we can see that in five billion plays of the game that "3 King Tuts" combination occurred on the first evaluation of a game 65,213,976 times. This combination occurred on the second evaluation (after the first evaluation symbols were removed) 141,898,654 times. It occurred on the twelfth evaluation a total of seven times in five billion plays.

TABLE 2

| | Evaluation Level | | | | |
|---|---|---|---|---|---|
| | 1 | 2 | 3 | 4 | 5 |
| 5 Wilds | 0 | 272 | 1,598 | 334 | 162 |
| 4 Wilds | 0 | 34,401 | 130,549 | 69,126 | 43,576 |
| 3 Wilds | 0 | 2,587,408 | 6,707,106 | 5,556,479 | 4,067,589 |
| 5 King Tuts | 0 | 262,558 | 320,962 | 277,881 | 199,064 |
| 4 King Tuts | 0 | 8,014,388 | 7,639,293 | 5,500,331 | 3,494,800 |
| 3 King Tuts | 65,213,976 | 141,898,654 | 82,971,521 | 42,832,641 | 21,163,444 |
| 5 Red 7's | 0 | 67,115 | 80,792 | 64,570 | 45,600 |
| 4 Red 7's | 0 | 3,182,777 | 2,716,509 | 2,121,873 | 1,457,347 |
| 3 Red 7's | 65,212,106 | 73,977,089 | 38,857,845 | 23,097,239 | 12,660,731 |
| 5 Black 7's | 0 | 66,908 | 80,378 | 64,961 | 45,896 |
| 4 Black 7's | 0 | 3,181,532 | 2,714,984 | 2,122,956 | 1,459,892 |
| 3 Black 7's | 65,227,771 | 73,990,925 | 38,862,622 | 23,099,365 | 12,654,370 |
| 5 Gold Bugs | 0 | 66,841 | 81,295 | 64,985 | 46,086 |
| 4 Gold Bugs | 0 | 3,185,925 | 2,713,683 | 2,124,348 | 1,459,577 |
| 3 Gold Bugs | 65,211,507 | 73,996,667 | 38,864,587 | 23,100,009 | 12,657,053 |

TABLE 2-continued

| | | | | | |
|---|---|---|---|---|---|
| 5 Silver Bugs | 0 | 67,336 | 80,815 | 64,567 | 45,748 |
| 4 Silver Bugs | 0 | 3,183,175 | 2,716,711 | 2,124,240 | 1,457,317 |
| 3 Silver Bugs | 65,208,828 | 73,998,127 | 38,867,800 | 23,095,387 | 12,661,470 |
| 5 Hawks | 0 | 261,432 | 321,339 | 278,755 | 198,286 |
| 4 Hawks | 0 | 8,016,517 | 7,638,972 | 5,502,077 | 3,494,197 |
| 3 Hawks | 65,226,514 | 141,910,205 | 82,964,439 | 42,843,297 | 21,176,487 |
| 5 Ankhs | 0 | 262,770 | 321,512 | 278,003 | 199,745 |
| 4 Ankhs | 0 | 8,014,304 | 7,638,232 | 5,505,807 | 3,494,576 |
| 3 Ankhs | 65,223,283 | 141,921,764 | 82,952,715 | 42,840,231 | 21,168,261 |
| 5 Eyes | 0 | 892,666 | 710,936 | 527,063 | 347,584 |
| 4 Eyes | 7,902,951 | 18,132,199 | 12,135,405 | 7,215,555 | 4,287,090 |
| 3 Eyes | 245,024,144 | 231,542,633 | 105,705,354 | 48,420,604 | 23,312,402 |
| 5 Any-7 | 5,645,419 | 2,939,576 | 1,255,094 | 674,427 | 408,138 |
| 4 Any-7 | 107,284,815 | 29,726,027 | 11,274,827 | 5,049,497 | 2,533,827 |
| 3 Any-7 | 965,563,566 | 179,387,261 | 50,794,270 | 15,594,602 | 4,472,587 |
| 5 Any Bug | 5,647,755 | 2,942,821 | 1,254,983 | 675,398 | 408,721 |
| 4 Any Bug | 107,299,993 | 29,720,480 | 11,277,437 | 5,050,245 | 2,533,938 |
| 3 Any Bug | 965,522,338 | 179,390,004 | 50,811,360 | 15,593,637 | 4,473,801 |

| | Evaluation Level | | | | | | |
|---|---|---|---|---|---|---|---|
| | 6 | 7 | 8 | 9 | 10 | 11 | 12 |
| 5 Wilds | 32 | 2 | 1 | 0 | 0 | 0 | 0 |
| 4 Wilds | 15,248 | 2,758 | 270 | 4 | 0 | 0 | 0 |
| 3 Wilds | 2,036,687 | 579,516 | 84,033 | 3,934 | 138 | 4 | 0 |
| 5 King Tuts | 90,931 | 24,434 | 2,981 | 182 | 4 | 0 | 0 |
| 4 King Tuts | 1,633,619 | 486,240 | 78,491 | 6,348 | 258 | 4 | 0 |
| 3 King Tuts | 9,451,570 | 3,187,016 | 667,642 | 84,559 | 6,819 | 400 | 7 |
| 5 Red 7's | 21,642 | 5,829 | 735 | 39 | 0 | 0 | 0 |
| 4 Red 7's | 734,391 | 225,347 | 36,544 | 2,914 | 116 | 2 | 0 |
| 3 Red 7's | 6,160,426 | 2,217,127 | 476,065 | 61,766 | 4,866 | 265 | 8 |
| 5 Black 7's | 21,794 | 5,856 | 690 | 32 | 1 | 0 | 0 |
| 4 Black 7's | 734,373 | 225,526 | 35,971 | 2,727 | 113 | 2 | 0 |
| 3 Black 7's | 6,159,697 | 2,215,868 | 476,092 | 61,867 | 4,781 | 268 | 3 |
| 5 Gold Bugs | 21,581 | 5,996 | 715 | 39 | 1 | 0 | 0 |
| 4 Gold Bugs | 733,569 | 225,786 | 35,946 | 2,730 | 100 | 1 | 0 |
| 3 Gold Bugs | 6,163,277 | 2,217,405 | 475,824 | 61,690 | 4,917 | 274 | 3 |
| 5 Silver Bugs | 21,545 | 5,776 | 705 | 37 | 0 | 0 | 0 |
| 4 Silver Bugs | 734,286 | 226,056 | 36,203 | 2,710 | 113 | 5 | 0 |
| 3 Silver Bugs | 6,163,741 | 2,216,351 | 477,108 | 62,159 | 4,853 | 280 | 5 |
| 5 Hawks | 90,826 | 24,268 | 2,904 | 182 | 7 | 0 | 0 |
| 4 Hawks | 1,632,831 | 487,375 | 78,469 | 6,356 | 273 | 5 | 0 |
| 3 Hawks | 9,443,535 | 3,189,968 | 668,048 | 84,724 | 6,677 | 371 | 5 |
| 5 Ankhs | 91,289 | 24,383 | 2,963 | 187 | 2 | 0 | 0 |
| 4 Ankhs | 1,634,352 | 487,410 | 77,958 | 6,460 | 288 | 6 | 0 |
| 3 Ankhs | 9,447,833 | 3,190,285 | 666,237 | 84,663 | 6,754 | 379 | 14 |
| 5 Eyes | 154,241 | 40,894 | 4,805 | 260 | 9 | 0 | 0 |
| 4 Eyes | 1,990,393 | 606,631 | 100,737 | 8,357 | 363 | 16 | 0 |
| 3 Eyes | 10,464,635 | 3,603,587 | 772,624 | 100,651 | 8,210 | 447 | 10 |
| 5 Any-7 | 191,103 | 55,119 | 7,660 | 442 | 13 | 0 | 0 |
| 4 Any-7 | 1,164,427 | 382,630 | 70,767 | 6,783 | 273 | 5 | 0 |
| 3 Any-7 | 1,178,985 | 293,404 | 61,192 | 8,742 | 543 | 15 | 2 |
| 5 Any Bug | 190,802 | 55,772 | 7,519 | 418 | 18 | 0 | 0 |
| 4 Any Bug | 1,164,736 | 382,622 | 70,458 | 6,904 | 274 | 7 | 0 |
| 3 Any Bug | 1,178,800 | 294,691 | 61,424 | 8,878 | 572 | 37 | 0 |

TABLE 3

| | Evaluation Level | | | | | |
|---|---|---|---|---|---|---|
| Probability | 1 | 2 | 3 | 4 | 5 | 6 |
| 5 Wilds | 0 | 5.44E−08 | 3.196E−07 | 6.68E−08 | 3.24E−08 | 6.4E−09 |
| 4 Wilds | 0 | 6.88E−06 | 2.611E−05 | 1.383E−05 | 8.715E−06 | 3.05E−06 |
| 3 Wilds | 0 | 0.0005175 | 0.0013414 | 0.0011113 | 0.0008135 | 0.0004073 |
| 5 King Tuts | 0 | 5.251E−05 | 6.419E−05 | 5.558E−05 | 3.981E−05 | 1.819E−05 |
| 4 King Tuts | 0 | 0.0016029 | 0.0015279 | 0.0011001 | 0.000699 | 0.0003267 |
| 3 King Tuts | 0.0130428 | 0.0283797 | 0.0165943 | 0.0085665 | 0.0042327 | 0.0018903 |
| 5 Red 7's | 0 | 1.342E−05 | 1.616E−05 | 1.291E−05 | 9.12E−06 | 4.328E−06 |
| 4 Red 7's | 0 | 0.0006366 | 0.0005433 | 0.0004244 | 0.0002915 | 0.0001469 |

TABLE 3-continued

| | | | | | | |
|---|---|---|---|---|---|---|
| 3 Red 7's | 0.0130424 | 0.0147954 | 0.0077716 | 0.0046194 | 0.0025321 | 0.0012321 |
| 5 Black 7's | 0 | 1.338E−05 | 1.608E−05 | 1.299E−05 | 9.179E−06 | 4.359E−06 |
| 4 Black 7's | 0 | 0.0006363 | 0.000543 | 0.0004246 | 0.000292 | 0.0001469 |
| 3 Black 7's | 0.0130456 | 0.0147982 | 0.0077725 | 0.0046199 | 0.0025309 | 0.0012319 |
| 5 Gold Bugs | 0 | 1.337E−05 | 1.626E−05 | 1.3E−05 | 9.217E−06 | 4.316E−06 |
| 4 Gold Bugs | 0 | 0.0006372 | 0.0005427 | 0.0004249 | 0.0002919 | 0.0001467 |
| 3 Gold Bugs | 0.0130423 | 0.0147993 | 0.0077729 | 0.00462 | 0.0025314 | 0.0012327 |
| 5 Silver Bugs | 0 | 1.347E−05 | 1.616E−05 | 1.291E−05 | 9.15E−06 | 4.309E−06 |
| 4 Silver Bugs | 0 | 0.0006366 | 0.0005433 | 0.0004248 | 0.0002915 | 0.0001469 |
| 3 Silver Bugs | 0.0130418 | 0.0147996 | 0.0077736 | 0.0046191 | 0.0025323 | 0.0012327 |
| 5 Hawks | 0 | 5.229E−05 | 6.427E−05 | 5.575E−05 | 3.966E−05 | 1.817E−05 |
| 4 Hawks | 0 | 0.0016033 | 0.0015278 | 0.0011004 | 0.0006988 | 0.0003266 |
| 3 Hawks | 0.0130453 | 0.028382 | 0.0165929 | 0.0085687 | 0.0042353 | 0.0018887 |
| 5 Ankhs | 0 | 5.255E−05 | 6.43E−05 | 5.56E−05 | 3.995E−05 | 1.826E−05 |
| 4 Ankhs | 0 | 0.0016029 | 0.0015276 | 0.0011012 | 0.0006989 | 0.0003269 |
| 3 Ankhs | 0.0130447 | 0.0283844 | 0.0165905 | 0.008568 | 0.0042337 | 0.0018896 |
| 5 Eyes | 0 | 0.0001785 | 0.0001422 | 0.0001054 | 6.952E−05 | 3.085E−05 |
| 4 Eyes | 0.0015806 | 0.0036264 | 0.0024271 | 0.0014431 | 0.0008574 | 0.0003981 |
| 3 Eyes | 0.0490048 | 0.0463085 | 0.0211411 | 0.0096841 | 0.0046625 | 0.0020929 |
| 5 Any-7 | 0.0011291 | 0.0005879 | 0.000251 | 0.0001349 | 8.163E−05 | 3.822E−05 |
| 4 Any-7 | 0.021457 | 0.0059452 | 0.002255 | 0.0010099 | 0.0005068 | 0.0002329 |
| 3 Any-7 | 0.1931127 | 0.0358775 | 0.0101589 | 0.0031189 | 0.0008945 | 0.0002358 |
| 5 Any Bug | 0.0011296 | 0.0005886 | 0.000251 | 0.0001351 | 8.174E−05 | 3.816E−05 |
| 4 Any Bug | 0.02146 | 0.0059441 | 0.0022555 | 0.00101 | 0.0005068 | 0.0002329 |
| 3 Any Bug | 0.1931045 | 0.035878 | 0.0101623 | 0.0031187 | 0.0008948 | 0.0002358 |

| | Evaluation Level | | | | | |
|---|---|---|---|---|---|---|
| Probability | 7 | 8 | 9 | 10 | 11 | 12 |
| 5 Wilds | 4E−10 | 2E−10 | 0 | 0 | 0 | 0 |
| 4 Wilds | 5.516E−07 | 5.4E−08 | 8E−10 | 0 | 0 | 0 |
| 3 Wilds | 0.0001159 | 1.681E−05 | 7.868E−07 | 2.76E−08 | 8E−10 | 0 |
| 5 King Tuts | 4.887E−06 | 5.962E−07 | 3.64E−08 | 8E−10 | 0 | 0 |
| 4 King Tuts | 9.725E−05 | 1.57E−05 | 1.27E−06 | 5.16E−08 | 8E−10 | 0 |
| 3 King Tuts | 0.0006374 | 0.0001335 | 1.691E−05 | 1.364E−06 | 8E−08 | 1.4E−09 |
| 5 Red 7's | 1.166E−06 | 1.47E−07 | 7.8E−09 | 0 | 0 | 0 |
| 4 Red 7's | 4.507E−05 | 7.309E−06 | 5.828E−07 | 2.32E−08 | 4E−10 | 0 |
| 3 Red 7's | 0.0004434 | 9.521E−05 | 1.235E−05 | 9.732E−07 | 5.3E−08 | 1.6E−09 |
| 5 Black 7's | 1.171E−06 | 1.38E−07 | 6.4E−09 | 2E−10 | 0 | 0 |
| 4 Black 7's | 4.511E−05 | 7.194E−06 | 5.454E−07 | 2.26E−08 | 4E−10 | 0 |
| 3 Black 7's | 0.0004432 | 9.522E−05 | 1.237E−05 | 9.562E−07 | 5.36E−08 | 6E−10 |
| 5 Gold Bugs | 1.199E−06 | 1.43E−07 | 7.8E−09 | 2E−10 | 0 | 0 |
| 4 Gold Bugs | 4.516E−05 | 7.189E−06 | 5.46E−07 | 2E−08 | 2E−10 | 0 |
| 3 Gold Bugs | 0.0004435 | 9.516E−05 | 1.234E−05 | 9.834E−07 | 5.48E−08 | 6E−10 |
| 5 Silver Bugs | 1.155E−06 | 1.41E−07 | 7.4E−09 | 0 | 0 | 0 |
| 4 Silver Bugs | 4.521E−05 | 7.241E−06 | 5.42E−07 | 2.26E−08 | 1E−09 | 0 |
| 3 Silver Bugs | 0.0004433 | 9.542E−05 | 1.243E−05 | 9.706E−07 | 5.6E−08 | 1E−09 |
| 5 Hawks | 4.854E−06 | 5.808E−07 | 3.64E−08 | 1.4E−09 | 0 | 0 |
| 4 Hawks | 9.748E−05 | 1.569E−05 | 1.271E−06 | 5.46E−08 | 1E−09 | 0 |
| 3 Hawks | 0.000638 | 0.0001336 | 1.694E−05 | 1.335E−06 | 7.42E−08 | 1E−09 |
| 5 Ankhs | 4.877E−06 | 5.926E−07 | 3.74E−08 | 4E−10 | 0 | 0 |
| 4 Ankhs | 9.748E−05 | 1.559E−05 | 1.292E−06 | 5.76E−08 | 1.2E−09 | 0 |
| 3 Ankhs | 0.0006381 | 0.0001332 | 1.693E−05 | 1.351E−06 | 7.58E−08 | 2.8E−09 |
| 5 Eyes | 8.179E−06 | 9.61E−07 | 5.2E−08 | 1.8E−09 | 0 | 0 |
| 4 Eyes | 0.0001213 | 2.015E−05 | 1.671E−06 | 7.26E−08 | 3.2E−09 | 0 |
| 3 Eyes | 0.0007207 | 0.0001545 | 2.013E−05 | 1.642E−06 | 8.94E−08 | 2E−09 |
| 5 Any-7 | 1.102E−05 | 1.532E−06 | 8.84E−08 | 2.6E−09 | 0 | 0 |
| 4 Any-7 | 7.653E−05 | 1.415E−05 | 1.357E−06 | 5.46E−08 | 1E−09 | 0 |
| 3 Any-7 | 5.868E−05 | 1.224E−05 | 1.748E−06 | 1.086E−07 | 3E−09 | 4E−10 |
| 5 Any Bug | 1.115E−05 | 1.504E−06 | 8.36E−08 | 3.6E−09 | 0 | 0 |
| 4 Any Bug | 7.652E−05 | 1.409E−05 | 1.381E−06 | 5.48E−08 | 1.4E−09 | 0 |
| 3 Any Bug | 5.894E−05 | 1.228E−05 | 1.776E−06 | 1.144E−07 | 7.4E−09 | 0 |

Table 3 shows the probability of any given game resulting in the specified combination at the specified evaluation level. The probability is computed by dividing the corresponding Table 2 occurrence count by the five billion total plays. For example, the probability of achieving a "3 King Tut" win on the first level evaluation of any given game is 0.0130428 or once every 76.67 games. The probability of getting a "3 King Tut" win on the second level evaluation of any given game is 0.0283797 or once every 35.24 games on average. Likewise, the probability of a "3 King Tut" win on the twelfth level evaluation is $1.4\times10^{-9}$ or once every 714,285,714 games on average.

Once the probabilities have been determined, they are combined with a paytable to determine the expected return. Table 4 shows a possible paytable for this game. The first column (Evaluation Level 1) shows the "base" payout values awarded on the first evaluation level. All of the other columns use this base value multiplied by the current Evaluation Level. This is done to take into account the multipliers used in this embodiment. If a different scheme were employed for awards on the various evaluation levels, then it would be taken into account in this paytable. Those skilled in the art can easily change the mechanics and make the corresponding changes to the paytable. Given the symbols and combinations allowed, it is this set of paytable values that will be modified to change the expected return of the base game, if desired.

Table 5 shows all of the Expected Value (EV) components for the different possible pays of the game. Each component is formed by multiplying the corresponding values from Table 3 (probability) and Table 4 (Pay Table value) and then dividing this product by the twenty credits required to play the game. Each EV component represents the fraction of each coin wagered that will be returned by the specific pay combination at that evaluation level.

The sum of all of these EV components is the Expected Return of the base game of this embodiment of this invention. As shown at the bottom of Table 5, all of the EV components summed together total 0.808107 indicating that 80.8107% of the credits wagered will be returned by the base game. It is well known in the art how to adjust the pay values of Table 4 to raise or lower this expected return from the base game. The expected return could also be modified by changing the components of the tile set or changing the methodology of selecting the symbols, as has been previously discussed.

TABLE 4

| | Evaluation Level | | | | | | | | | | | |
|---|---|---|---|---|---|---|---|---|---|---|---|---|
| Pay Table | 1 | 2 | 3 | 4 | 5 | 6 | 7 | 8 | 9 | 10 | 11 | 12 |
| 5 Wilds | 1000 | 2000 | 3000 | 4000 | 5000 | 6000 | 7000 | 8000 | 9000 | 10000 | 11000 | 12000 |
| 4 Wilds | 300 | 600 | 900 | 1200 | 1500 | 1800 | 2100 | 2400 | 2700 | 3000 | 3300 | 3600 |
| 3 Wilds | 25 | 50 | 75 | 100 | 125 | 150 | 175 | 200 | 225 | 250 | 275 | 300 |
| 5 King Tuts | 300 | 600 | 900 | 1200 | 1500 | 1800 | 2100 | 2400 | 2700 | 3000 | 3300 | 3600 |
| 4 King Tuts | 100 | 200 | 300 | 400 | 500 | 600 | 700 | 800 | 900 | 1000 | 1100 | 1200 |
| 3 King Tuts | 10 | 20 | 30 | 40 | 50 | 60 | 70 | 80 | 90 | 100 | 110 | 120 |
| 5 Red 7's | 100 | 200 | 300 | 400 | 500 | 600 | 700 | 800 | 900 | 1000 | 1100 | 1200 |
| 4 Red 7's | 45 | 90 | 135 | 180 | 225 | 270 | 315 | 360 | 405 | 450 | 495 | 540 |
| 3 Red 7's | 15 | 30 | 45 | 60 | 75 | 90 | 105 | 120 | 135 | 150 | 165 | 180 |
| 5 Black 7's | 100 | 200 | 300 | 400 | 500 | 600 | 700 | 800 | 900 | 1000 | 1100 | 1200 |
| 4 Black 7's | 35 | 70 | 105 | 140 | 175 | 210 | 245 | 280 | 315 | 350 | 385 | 420 |
| 3 Black 7's | 8 | 16 | 24 | 32 | 40 | 48 | 56 | 64 | 72 | 80 | 88 | 96 |
| 5 Gold Bugs | 100 | 200 | 300 | 400 | 500 | 600 | 700 | 800 | 900 | 1000 | 1100 | 1200 |
| 4 Gold Bugs | 30 | 60 | 90 | 120 | 150 | 180 | 210 | 240 | 270 | 300 | 330 | 360 |
| 3 Gold Bugs | 6 | 12 | 18 | 24 | 30 | 36 | 42 | 48 | 54 | 60 | 66 | 72 |
| 5 Silver Bugs | 100 | 200 | 300 | 400 | 500 | 600 | 700 | 800 | 900 | 1000 | 1100 | 1200 |
| 4 Silver Bugs | 20 | 40 | 60 | 80 | 100 | 120 | 140 | 160 | 180 | 200 | 220 | 240 |
| 3 Silver Bugs | 4 | 8 | 12 | 16 | 20 | 24 | 28 | 32 | 36 | 40 | 44 | 48 |
| 5 Hawks | 70 | 140 | 210 | 280 | 350 | 420 | 490 | 560 | 630 | 700 | 770 | 840 |
| 4 Hawks | 15 | 30 | 45 | 60 | 75 | 90 | 105 | 120 | 135 | 150 | 165 | 180 |
| 3 Hawks | 5 | 10 | 15 | 20 | 25 | 30 | 35 | 40 | 45 | 50 | 55 | 60 |
| 5 Ankhs | 50 | 100 | 150 | 200 | 250 | 300 | 350 | 400 | 450 | 500 | 550 | 600 |
| 4 Ankhs | 10 | 20 | 30 | 40 | 50 | 60 | 70 | 80 | 90 | 100 | 110 | 120 |
| 3 Ankhs | 5 | 10 | 15 | 20 | 25 | 30 | 35 | 40 | 45 | 50 | 55 | 60 |
| 5 Eyes | 30 | 60 | 90 | 120 | 150 | 180 | 210 | 240 | 270 | 300 | 330 | 360 |
| 4 Eyes | 5 | 10 | 15 | 20 | 25 | 30 | 35 | 40 | 45 | 50 | 55 | 60 |
| 3 Eyes | 2 | 4 | 6 | 8 | 10 | 12 | 14 | 16 | 18 | 20 | 22 | 24 |
| 5 Any-7 | 40 | 80 | 120 | 160 | 200 | 240 | 280 | 320 | 360 | 400 | 440 | 480 |
| 4 Any-7 | 10 | 20 | 30 | 40 | 50 | 60 | 70 | 80 | 90 | 100 | 110 | 120 |
| 3 Any-7 | 5 | 10 | 15 | 20 | 25 | 30 | 35 | 40 | 45 | 50 | 55 | 60 |
| 5 Any Bug | 25 | 50 | 75 | 100 | 125 | 150 | 175 | 200 | 225 | 250 | 275 | 300 |
| 4 Any Bug | 10 | 20 | 30 | 40 | 50 | 60 | 70 | 80 | 90 | 100 | 110 | 120 |
| 3 Any Bug | 3 | 6 | 9 | 12 | 15 | 18 | 21 | 24 | 27 | 30 | 33 | 36 |

TABLE 5

| | Evaluation Level | | | | | |
|---|---|---|---|---|---|---|
| EV Table | 1 | 2 | 3 | 4 | 5 | 6 |
| 5 Wilds | 0 | 5.44E−06 | 4.79E−05 | 1.34E−05 | 8.1E−06 | 1.92E−06 |
| 4 Wilds | 0 | 0.0002064 | 0.001175 | 0.00083 | 0.000654 | 0.000274 |
| 3 Wilds | 0 | 0.0012937 | 0.00503 | 0.005556 | 0.005084 | 0.003055 |
| 5 King Tuts | 0 | 0.0015753 | 0.002889 | 0.003335 | 0.002986 | 0.001637 |
| 4 King Tuts | 0 | 0.0160288 | 0.022918 | 0.022001 | 0.017474 | 0.009802 |
| 3 King Tuts | 0.0065214 | 0.0283797 | 0.024891 | 0.017133 | 0.010582 | 0.005671 |
| 5 Red 7's | 0 | 0.0001342 | 0.000242 | 0.000258 | 0.000228 | 0.00013 |
| 4 Red 7's | 0 | 0.0028645 | 0.003667 | 0.003819 | 0.003279 | 0.001983 |
| 3 Red 7's | 0.0097818 | 0.0221931 | 0.017486 | 0.013858 | 0.009496 | 0.005544 |
| 5 Black 7's | 0 | 0.0001338 | 0.000241 | 0.00026 | 0.000229 | 0.000131 |
| 4 Black 7's | 0 | 0.0022271 | 0.002851 | 0.002972 | 0.002555 | 0.001542 |
| 3 Black 7's | 0.0052182 | 0.0118385 | 0.009327 | 0.007392 | 0.005062 | 0.002957 |
| 5 Gold Bugs | 0 | 0.0001337 | 0.000244 | 0.00026 | 0.00023 | 0.000129 |
| 4 Gold Bugs | 0 | 0.0019116 | 0.002442 | 0.002549 | 0.002189 | 0.00132 |
| 3 Gold Bugs | 0.0039127 | 0.0088796 | 0.006996 | 0.005544 | 0.003797 | 0.002219 |
| 5 Silver Bugs | 0 | 0.0001347 | 0.000242 | 0.000258 | 0.000229 | 0.000129 |
| 4 Silver Bugs | 0 | 0.0012733 | 0.00163 | 0.001699 | 0.001457 | 0.000881 |
| 3 Silver Bugs | 0.0026084 | 0.0059199 | 0.004664 | 0.003695 | 0.002532 | 0.001479 |
| 5 Hawks | 0 | 0.000366 | 0.000675 | 0.000781 | 0.000694 | 0.000381 |
| 4 Hawks | 0 | 0.002405 | 0.003438 | 0.003301 | 0.002621 | 0.00147 |

TABLE 5-continued

| | | | | | | |
|---|---|---|---|---|---|---|
| 3 Hawks | 0.0032613 | 0.014191 | 0.012445 | 0.008569 | 0.005294 | 0.002833 |
| 5 Ankhs | 0 | 0.0002628 | 0.000482 | 0.000556 | 0.000499 | 0.000274 |
| 4 Ankhs | 0 | 0.0016029 | 0.002291 | 0.002202 | 0.001747 | 0.000981 |
| 3 Ankhs | 0.0032612 | 0.0141922 | 0.012443 | 0.008568 | 0.005292 | 0.002834 |
| 5 Eyes | 0 | 0.0005356 | 0.00064 | 0.000632 | 0.000521 | 0.000278 |
| 4 Eyes | 0.0003951 | 0.0018132 | 0.00182 | 0.001443 | 0.001072 | 0.000597 |
| 3 Eyes | 0.0049005 | 0.0092617 | 0.006342 | 0.003874 | 0.002331 | 0.001256 |
| 5 Any-7 | 0.0022582 | 0.0023517 | 0.001506 | 0.001079 | 0.000816 | 0.000459 |
| 4 Any-7 | 0.0107285 | 0.0059452 | 0.003382 | 0.00202 | 0.001267 | 0.000699 |
| 3 Any-7 | 0.0482782 | 0.0179387 | 0.007619 | 0.003119 | 0.001118 | 0.000354 |
| 5 Any Bug | 0.0014119 | 0.0014714 | 0.000941 | 0.000675 | 0.000511 | 0.000286 |
| 4 Any Bug | 0.01073 | 0.0059441 | 0.003383 | 0.00202 | 0.001267 | 0.000699 |
| 3 Any Bug | 0.0289657 | 0.0107634 | 0.004573 | 0.001871 | 0.000671 | 0.000212 |
| | 0.142233 | 0.1941781 | 0.168966 | 0.132145 | 0.093794 | 0.052498 |

| | Evaluation Level | | | | | |
|---|---|---|---|---|---|---|
| EV Table | 7 | 8 | 9 | 10 | 11 | 12 |
| 5 Wilds | 1.4E−07 | 8E−08 | 0 | 0 | 0 | 0 |
| 4 Wilds | 5.79E−05 | 6.48E−06 | 1.08E−07 | 0 | 0 | 0 |
| 3 Wilds | 0.001014 | 0.000168 | 8.85E−06 | 3.45E−07 | 1.1E−08 | 0 |
| 5 King Tuts | 0.000513 | 7.15E−05 | 4.91E−06 | 1.2E−07 | 0 | 0 |
| 4 King Tuts | 0.003404 | 0.000628 | 5.71E−05 | 2.58E−06 | 4.4E−08 | 0 |
| 3 King Tuts | 0.002231 | 0.000534 | 7.61E−05 | 6.82E−06 | 4.4E−07 | 8.4E−09 |
| 5 Red 7's | 4.08E−05 | 5.88E−06 | 3.51E−07 | 0 | 0 | 0 |
| 4 Red 7's | 0.00071 | 0.000132 | 1.18E−05 | 5.22E−07 | 9.9E−09 | 0 |
| 3 Red 7's | 0.002328 | 0.000571 | 8.34E−05 | 7.3E−06 | 4.37E−07 | 1.44E−08 |
| 5 Black 7's | 4.1E−05 | 5.52E−06 | 2.88E−07 | 1E−08 | 0 | 0 |
| 4 Black 7's | 0.000553 | 0.000101 | 8.59E−06 | 3.96E−07 | 7.7E−09 | 0 |
| 3 Black 7's | 0.001241 | 0.000305 | 4.45E−05 | 3.82E−06 | 2.36E−07 | 2.88E−09 |
| 5 Gold Bugs | 4.2E−05 | 5.72E−06 | 3.51E−07 | 1E−08 | 0 | 0 |
| 4 Gold Bugs | 0.000474 | 8.63E−05 | 7.37E−06 | 3E−07 | 3.3E−09 | 0 |
| 3 Gold Bugs | 0.000931 | 0.000228 | 3.33E−05 | 2.95E−06 | 1.81E−07 | 2.16E−09 |
| 5 Silver Bugs | 4.04E−05 | 5.64E−06 | 3.33E−07 | 0 | 0 | 0 |
| 4 Silver Bugs | 0.000316 | 5.79E−05 | 4.88E−06 | 2.26E−07 | 1.1E−08 | 0 |
| 3 Silver Bugs | 0.000621 | 0.000153 | 2.24E−05 | 1.94E−06 | 1.23E−07 | 2.4E−09 |
| 5 Hawks | 0.000119 | 1.63E−05 | 1.15E−06 | 4.9E−08 | 0 | 0 |
| 4 Hawks | 0.000512 | 9.42E−05 | 8.58E−06 | 4.1E−07 | 8.25E−09 | 0 |
| 3 Hawks | 0.001116 | 0.000267 | 3.81E−05 | 3.34E−06 | 2.04E−07 | 3E−09 |
| 5 Ankhs | 8.53E−05 | 1.19E−05 | 8.42E−07 | 1E−08 | 0 | 0 |
| 4 Ankhs | 0.000341 | 6.24E−05 | 5.81E−06 | 2.88E−07 | 6.6E−09 | 0 |
| 3 Ankhs | 0.001117 | 0.000266 | 3.81E−05 | 3.38E−06 | 2.08E−07 | 8.4E−09 |
| 5 Eyes | 8.59E−05 | 1.15E−05 | 7.02E−07 | 2.7E−08 | 0 | 0 |
| 4 Eyes | 0.000212 | 4.03E−05 | 3.76E−06 | 1.82E−07 | 8.8E−09 | 0 |
| 3 Eyes | 0.000505 | 0.000124 | 1.81E−05 | 1.64E−06 | 9.83E−08 | 2.4E−09 |
| 5 Any-7 | 0.000154 | 2.45E−05 | 1.59E−06 | 5.2E−08 | 0 | 0 |
| 4 Any-7 | 0.000268 | 5.66E−05 | 6.1E−06 | 2.73E−07 | 5.5E−09 | 0 |
| 3 Any-7 | 0.000103 | 2.45E−05 | 3.93E−06 | 2.72E−07 | 8.25E−09 | 1.2E−09 |
| 5 Any Bug | 9.76E−05 | 1.5E−05 | 9.41E−07 | 4.5E−08 | 0 | 0 |
| 4 Any Bug | 0.000268 | 5.64E−05 | 6.21E−06 | 2.74E−07 | 7.7E−09 | 0 |
| 3 Any Bug | 6.19E−05 | 1.47E−05 | 2.4E−06 | 1.72E−07 | 1.22E−08 | 0 |
| | 0.019603 | 0.00415 | 0.000501 | 3.78E−05 | 2.07E−06 | 4.52E−08 |
| | | Total of all EV values in this table: | | | | 0.808107 |

The simulation program that created the occurrence counts also kept track of whatever other statistics are necessary to regulate the pay values of the game. In this embodiment, one must determine how often each column is cleared, as well as how often the entire matrix of twenty-five squares is cleared in order to determine the Expected Return.

Table 6 shows the calculation for the Expected Return from the Bonus Game. For the purposes of clarity, columns in the game are now referred to here as "stacks", so as not be confused with columns in the table. The first column of the table shows the name of the game stack. The five stacks get cleared out at different frequencies, so they were tracked separately by the simulation program. The second column of Table 6 shows the number of times the specific stack was cleared in five billion plays. The third column computes the probability of clearing that particular stack, which is the second column Occurrences divided by the five billion total plays. As expected, the closer to the horizontal center, the more often a stack is cleared. This is due to there being more ways to use a symbol in the center stack in a winning horizontal combination. The fourth column shows the probability of the "Bonus" background appearing (as seen in stacks three and four of FIG. 14) in this stack on a given game. These values may be arbitrarily set, and will determine the frequency of the bonus round symbol in that stack.

The fifth column is the probability of initiating the bonus round by clearing the current game stack. It is the product of the third column probability of clearing a stack and the fourth column probability of the "Bonus" background appearing. The sum of all of the fifth column values is the probability of entering the bonus round on any given game. This is 0.1095952 or 1 in 91.24 games. The frequency will actually be a little lower, since there will be occasions when multiple columns marked with "Bonus" are cleared. When this happens, the bonus award will be multiplied by the number of initiating columns. Alternatively, the game could offer multiple bonus rounds for multiple initiating columns. In either case, Table 6 correctly computes the return as there will be on average one bonus game award for every 91.24 games played. This frequency could be raised or lowered by modifying the fourth column values of probability of "Bonus" appearing in the stacks.

The sixth column shows the expected return of a bonus game. The construction of bonus games to meet a given return is well known in the art and is not shown here. The bonus game of this embodiment provides a return, on average of 213.421269 credits for a twenty credit wager.

The seventh column computes the return for bonus games initiated by this stack. It is the product of the fifth column probability of initiating a bonus game in this stack and the sixth column expected return of the bonus game, divided by the twenty credit wager required for this embodiment of the game. The sum of all EV components is shown at the bottom of the seventh column. The total expected return from the bonus game is 0.11694971 or 11.69% of the credits wagered. This return could be modified by changing either the column six EV of each Bonus Game or the column four Probability of "Bonus" in each stack.

TABLE 6

Expected Return from Bonus Game

| | Occurrences of Stack Cleared | Probability Of Clearing Stack | Probability Of "Bonus" in Stack | Probability of Playing Bonus Game | EV of each Bonus Game | EV component for this column |
|---|---|---|---|---|---|---|
| Stack 1 | 35,937,325 | 0.00718747 | 0.272 | 0.00195499 | 213.421269 | 0.02086183 |
| Stack 2 | 47,077,374 | 0.00941547 | 0.26 | 0.00244802 | 213.421269 | 0.02612301 |
| Stack 3 | 48,951,896 | 0.00979038 | 0.22 | 0.00215388 | 213.421269 | 0.02298423 |
| Stack 4 | 47,081,012 | 0.0094162 | 0.26 | 0.00244821 | 213.421269 | 0.02612503 |
| Stack 5 | 35,926,618 | 0.00718532 | 0.272 | 0.00195441 | 213.421269 | 0.02085561 |
| | | | | 0.01095952 | | |
| | | EV of Bonus Game | | | | 0.11694971 |

Average of 1 bonus game every 91.2448887 games played

Table 7 shows the Expected Return for the Bonus for clearing the entire board. In the Occurrences column it shows that the simulation program cleared the board 14,267 times in the five billion simulated plays. The probability is computed by dividing this number of Occurrences by the five billion plays completed. The "1 in X" is the reciprocal of the probability showing that the board will be cleared on average every 350,459 plays. By setting the award for clearing the board at 25000 credits, we have an EV component of 0.003567, which is the product of this pay value and the probability. We can raise or lower this component by changing the Pay value as is well known in the art.

TABLE 7

Bonus for Clearing the Entire Board

| | Occurrences | Probability | 1 in X | Pay | EV |
|---|---|---|---|---|---|
| Clearing the Board | 14267 | 2.8534E−06 | 350,459.10 | 25000 | 0.003567 |

Table 8 shows the entire return of the game, summing up the components from the Base Game (Table 5), the Bonus Game (Table 6) and the Clearing the Board Bonus (Table 7). This shows that the total return is 0.928624 or 92.86%. This is the percentage of credits wagered that will be returned to the player in the long run with the machine retaining or "holding" 7.14% of all credits wagered.

TABLE 8

Total Return for Game

| | |
|---|---|
| Return from Base Game | 0.808107 |
| Return from Bonus Game | 0.116950 |
| Return for Clearing the Board | 0.003567 |
| Total Return | 0.928624 |

As mentioned previously, if a game utilizes a different number of played spots or game element locations, a similar analysis must be completed in order to determine the payouts for various possibilities of winning spot combinations. The corresponding paytable for playing one spot (see FIG. 3) is shown in Table 9. The analysis and paytables for playing other number of spots are left to the reader.

TABLE 9

| Occurrence | Pays |
|---|---|
| 3 Daytime Scene | 6 |
| 3 Nighttime Scene | 4 |
| 5 "Any" Scene | 10 |
| 4 "Any" Scene | 8 |
| 3 "Any" Scene | 2 |

Thus, while the present invention has been described with respect to a particular embodiment, those of skill in this art will recognize even more variations, applications and modifications which will still fall within the spirit and scope of the invention, all as intended to come within the ambit and reach of the following claims:

What is claimed is:

1. A method of playing a game, comprising the steps of:

a) providing a game matrix having a plurality of game element locations;

b) providing game elements including differing subsets of game elements that have a predetermined matching relationship;

c) randomly assigning game elements to a respective game element location for a first gameplay condition;

d) determining according to a preset game methodology whether any of said randomly assigned game elements are in a matching relationship for a positive outcome in said first gameplay condition, wherein said matching relationship comprises at least two game elements having an associative indicium in a subset;

e) transforming said game elements which make up a positive outcome according to said game methodology such that in at least a plurality of transformations, but not necessarily all transformations, at least one "Wild" game element, which has the attribute of matching a plurality of different game element indicia, replaces a game element in said positive outcome;

f) eliminating at least one of said game elements of each positive outcome, thereby creating an open space for that game element location;

g) after transformation and elimination, determining whether a remaining game element can be moved according to a movement methodology designed to fill an open space, and moving any remaining game element as permitted by said methodology without adding any game element to fill any remaining open space for a subsequent gameplay condition;

h) determining according to said game methodology whether said game elements in said subsequent gameplay condition comprise a positive outcome; and i) repeating steps (e) through (h) so long as there is a positive outcome for continued gameplay.

2. The method of claim 1 wherein said matching relationship for a positive outcome comprises at least three game elements having an associative indicium in a subset.

3. The method of claim 2 wherein said associative indicium is the same in a subset.

4. The method of claim 2 wherein said transformation step comprises eliminating all of said game elements of each positive outcome.

5. The method of claim 4 wherein only one "Wild" game element results from said transformation step.

6. The method of claim 5 wherein said at least three game elements are contiguous in a line for said transformation step.

7. The method of claim 6 wherein said "Wild" game element occurs with every transformation step.

8. A video gaming machine comprising (i) a processor, (ii) data storage, and (iii) program code stored in the data storage that, if executed by the processor, causes the video gaming machine to perform steps comprising:

a) providing a game matrix having a plurality of game element locations;

b) providing game elements including differing subsets of game elements that have a predetermined matching relationship;

c) randomly assigning game elements to a respective game element location for a first gameplay condition;

d) determining according to a preset game methodology whether any of said randomly assigned game elements are in a matching relationship for a positive outcome in said first gameplay condition, wherein said matching relationship comprises at least two game elements having an associative indicium in a subset;

e) transforming said game elements which make up a positive outcome according to said game methodology such that in at least a plurality of transformations, but not necessarily all transformations, at least one "Wild" game element, which has the attribute of matching a plurality of different game element indicia, replaces a game element in said positive outcome;

f) eliminating at least one of said game elements of each positive outcome, thereby creating an open space for that game element location;

g) after transformation and elimination, determining whether a remaining game element can be moved according to a movement methodology designed to fill an open space, and moving any remaining game element as permitted by said methodology without adding any game element to fill any remaining open space for a subsequent gameplay condition;

h) determining according to said game methodology whether said game elements in said subsequent gameplay condition comprise a positive outcome; and i) repeating steps (e) through (h) so long as there is a positive outcome for continued gameplay.

* * * * *